(12) United States Patent
Futaki et al.

(10) Patent No.: US 12,256,271 B2
(45) Date of Patent: *Mar. 18, 2025

(54) RADIO COMMUNICATION SYSTEM, RADIO STATION, RADIO TERMINAL, COMMUNICATION CONTROL METHOD, AND COMPUTER-READABLE MEDIUM

(71) Applicant: NEC Corporation, Tokyo (JP)

(72) Inventors: Hisashi Futaki, Tokyo (JP); Hiroaki Aminaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 282 days.

This patent is subject to a terminal disclaimer.

(21) Appl. No.: 17/849,806

(22) Filed: Jun. 27, 2022

(65) Prior Publication Data
US 2022/0330101 A1    Oct. 13, 2022

Related U.S. Application Data

(63) Continuation of application No. 16/730,074, filed on Dec. 30, 2019, now Pat. No. 11,382,002, which is a
(Continued)

(30) Foreign Application Priority Data

Dec. 28, 2012    (JP) ................................. 2012-288212

(51) Int. Cl.
*H04W 36/00*    (2009.01)
*H04B 7/024*    (2017.01)
(Continued)

(52) U.S. Cl.
CPC ........ *H04W 36/0016* (2013.01); *H04B 7/024* (2013.01); *H04W 36/00692* (2023.05);
(Continued)

(58) Field of Classification Search
CPC . H04W 36/0016; H04W 76/15; H04W 76/28; H04W 36/08; H04W 36/30; H04B 7/024
See application file for complete search history.

(56) References Cited

U.S. PATENT DOCUMENTS

2002/0187785 A1    12/2002  Iizuka
2009/0034476 A1    2/2009  Wang et al.
(Continued)

FOREIGN PATENT DOCUMENTS

| CN | 101409920 A | 4/2009 |
|---|---|---|
| CN | 101658057 A | 2/2010 |

(Continued)

OTHER PUBLICATIONS

NTT DOCOMO, Inc., "Proposed work plan for higher layer study of small cell enhancements in RAN2/3", 3GPP TSG-RAN meeting #58 RP-121801, Dec. 4-7, 2012.
(Continued)

*Primary Examiner* — Christopher M Crutchfield
*Assistant Examiner* — Jean F Voltaire

(57) ABSTRACT

A radio network (6) and a radio terminal (4) are configured to, when the radio terminal (4) is using a first cell (10) served by a first radio station (1) as a primary cell and a second cell (20) served by a second radio station (2) as a secondary cell, change the secondary cell form the second cell (20) to a third cell (30) while keeping communication status information regarding the radio terminal (4) on the second cell (20). It is thus, for example, possible to enable a communication service in the secondary cell to be continued after the secondary cell is changed when the radio terminal which is simultaneously using a plurality of cells served by different radio stations changes the secondary cell from a cell of one radio station to a cell of another radio station.

6 Claims, 17 Drawing Sheets

Related U.S. Application Data continuation of application No. 14/655,936, filed as application No. PCT/JP2013/007044 on Dec. 2, 2013, now Pat. No. 10,548,051.

(51) Int. Cl.
| | | |
|---|---|---|
| *H04W 36/08* | (2009.01) | |
| *H04W 36/28* | (2009.01) | |
| *H04W 76/15* | (2018.01) | |
| *H04W 76/28* | (2018.01) | |
| *H04W 24/10* | (2009.01) | |
| *H04W 36/02* | (2009.01) | |
| *H04W 48/20* | (2009.01) | |
| *H04W 74/00* | (2009.01) | |
| *H04W 76/10* | (2018.01) | |
| *H04W 84/04* | (2009.01) | |
| *H04W 88/06* | (2009.01) | |
| *H04W 88/08* | (2009.01) | |

(52) U.S. Cl.
CPC ......... *H04W 36/087* (2023.05); *H04W 36/28* (2013.01); *H04W 76/15* (2018.02); *H04W 76/28* (2018.02); *H04W 24/10* (2013.01); *H04W 36/00695* (2023.05); *H04W 36/02* (2013.01); *H04W 36/0235* (2023.05); *H04W 48/20* (2013.01); *H04W 74/004* (2013.01); *H04W 76/10* (2018.02); *H04W 84/045* (2013.01); *H04W 88/06* (2013.01); *H04W 88/08* (2013.01)

(56) References Cited

U.S. PATENT DOCUMENTS

| | | | |
|---|---|---|---|
| 2009/0092097 A1 | 4/2009 | Nylander | |
| 2011/0075633 A1 | 3/2011 | Johansson et al. | |
| 2011/0103277 A1 | 5/2011 | Watfa et al. | |
| 2011/0201367 A1 | 8/2011 | Aminaka et al. | |
| 2012/0040683 A1 | 2/2012 | Shan et al. | |
| 2012/0044836 A1 | 2/2012 | Sivavakcesar et al. | |
| 2012/0236827 A1* | 9/2012 | Izawa ................... | H04W 36/02 370/331 |
| 2012/0281544 A1 | 11/2012 | Anepu et al. | |
| 2014/0004863 A1* | 1/2014 | Zhang ............... | H04W 36/0033 455/444 |
| 2014/0056243 A1* | 2/2014 | Pelletier ................ | H04L 5/0032 370/329 |
| 2014/0087731 A1 | 3/2014 | Zhang et al. | |
| 2014/0219248 A1* | 8/2014 | Reddiboyana ........ | H04W 76/15 370/331 |
| 2014/0370897 A1* | 12/2014 | Vesterinen ............ | H04W 36/08 455/436 |
| 2015/0208283 A1 | 7/2015 | Yang et al. | |

FOREIGN PATENT DOCUMENTS

| | | |
|---|---|---|
| CN | 101772108 A | 7/2010 |
| CN | 101838373 A | 8/2010 |
| CN | 101938784 A | 1/2011 |
| CN | 101938795 A | 1/2011 |
| CN | 102083148 A | 6/2011 |
| CN | 102662465 A | 8/2012 |
| CN | 102833802 A | 12/2012 |
| JP | 2012-238153 | 12/2012 |
| KR | 10-2012-0046692 | 5/2012 |
| KR | 10-2012-0067937 | 6/2012 |
| KR | 10-2012-0139757 | 12/2012 |
| WO | 2009/022736 A1 | 3/2009 |
| WO | WO 2011/137784 A1 | 11/2011 |
| WO | WO 2011/156769 A1 | 12/2011 |
| WO | 2012/044694 A1 | 4/2012 |
| WO | WO 2012/116625 A1 | 9/2012 |
| WO | WO 2012/159529 A1 | 11/2012 |
| WO | WO 2012/166975 | 12/2012 |

OTHER PUBLICATIONS

3GPP TS 36.331 V11.1.0, "Evolved Universal Terrestrial Radio Access (E-UTRA), Radio Resource Control (RRC), Protocol specification", pp. 1-325, Sep. 2012.

3GPP TS 36.300 V11.3.0. "Evolved Universal Terrestrial Radio Access (E-UTRA) and Evolved Universal Terrestrial Radio Access Network (E-UTRAN), Overall description, Stage 2", pp. 1-205, Sep. 2012.

Samsung Electronics. "Technologies for Rel-12 and Onwards", RWS-120046, 3GPP TSG RAN Workshop on Rel-12 and Onwards, pp. 1-31, Jun. 2012.

NTT DOCOMO, Inc., "Requirements, Candidate Solutions & Technology Roadmap for LTE Rel-12 Onward", RWS-120010, 3GPP Workshop on Release 12 and onwards, pp. 1-27, Jun. 2012.

Catt. "Handling of SCell Configuration in HO Procedure", 3GPP TSG RAN WG2 Meeting #72, R2-106385, pp. 1-2, Nov. 2010.

Panasonic, "SCell configuration at SCell addition and HO", 3GPP TSG RAN WG2#71bis, R2-105763, Oct. 2010.

International Search Report mailed Jan. 28. 2014 in corresponding PCT International Application.

Japanese Office Action issued by the Japanese Patent Office in counterpart Japanese Patent Application No. 2014-554093, mailed April June 5. 2018.

Extended European Search Report of the counterpart European Patent Application No. 18 21 4257 dated Jul. 9, 2019.

Office Action dated Aug. 7, 2018, issued by the Intellectual Property Office of Singapore in the counterpart Singapore Patent Application No. 10201701222Q.

Notice of Allowance issued by the Korean Intellectual Property Office in counterpart Korean Patent Application No. 10-2015-7016360, dated Apr. 27, 2017.

Extended European Search Report issued by the European Patent Office in counterpsit European Patent Application No. 17154276.4, dated Apr. 18, 2017.

NSN et al., "Handover procedure in case of bearer only served by SeNB (1A)", 3GPP Generation Partnership Project (3GPP), Mobile Competence Centre, 3GPP TSG-RAN WG3 Meeting #82, R3-132101. XP050738361, 13 pages, (2013).

Extended European Search Report issued by the European Patent Office on Jul. 15, 2016, in counterpart European Patent Application No. 13869155.5.

Written Opinion and Search Report issued by the Singapore Patent Office on May 24, 2016 in counterpart Singapore Patent Application No. 112016050878.

Office Action from the European Patent Office Issued on Jun. 15, 2018, in counterpart European Patent Application No. 13 869 155.5.

Notification of First Office Action issued on Nov. 18, 2017, from the State intellectual Property office of the People's Republic of China in counterpart Chinese Patent Application 201380068731.3.

R2-095693, "Serving Cell Handling in CA", 3GPP TSG-RAN WG2 #67bis, Oct. 12, 2009.

Extended European Search Report dated Jan. 27, 2020, Issued by the European Patent Office In counterpar European Patent Application No. 19208729.4.

Notification of First Office Action dated Sep. 27. 2020, issued by the Chinese Patent Office in counterpart Chinese Patent Application No. 201811325291.6.

Chinese Office Action for CN Application No. 201811323668.4 mailed on Apr. 22, 2021 with English Translation.

Japanese Office Action for JP Application No. 2020-128871 mailed on Sep. 21, 2021 with English Translation.

SG Office Communication for SG Application No. 10202010526Y, mailed on Nov. 9, 2022.

(56) References Cited

OTHER PUBLICATIONS

KDDI, "Performance evaluations of RSRP-based handover with cell range expansion", 3GPP TSG RAN WG1 Meeting #67, R1-114165, Nov. 18, 2011.

* cited by examiner

RADIO COMMUNICATION SYSTEM, RADIO STATION, RADIO TERMINAL, COMMUNICATION CONTROL METHOD, AND COMPUTER-READABLE MEDIUM

CROSS-REFERENCE TO RELATED APPLICATIONS

The present application is a continuation application of U.S. patent application Ser. No. 16/730,074 filed on Dec. 30, 2019, which is a continuation application of U.S. patent application Ser. No. 14/655,936 filed on Jun. 26, 2015, which is issued as U.S. Pat. No. 10,548,051, which is a National Stage Entry of international application PCT/JP2013/007044 filed on Dec. 2, 2013, which claims the benefit of priority from Japanese Patent Application No. 2012-288212 filed on Dec. 28, 2012, the disclosures of all of which are incorporated in their entirety by reference herein.

TECHNICAL FIELD

The present invention relates to a radio communication system in which a radio station and a radio terminal communicate with each other using a plurality of cells.

BACKGROUND ART

In order to improve communication quality and speed further to cope with an abrupt increase in mobile data traffic in recent years, standardization of a carrier aggregation (CA) function of allowing a radio base station (eNode B (eNB)) and a radio terminal (user equipment (UE)) to communicate with each other using a plurality of cells has been discussed in 3GPP LTE (Long Term Evolution). The cells that a UE can use in the CA are limited to cells of one eNB (i.e., cells served by one eNB).

The cells used by the UE are classified into a primary cell (PCell) which has already been used as a serving cell at the start of CA and a secondary cell (SCell) which is used additionally or subordinately. Non-Access Stratum (NAS) mobility information, security information (security input), and the like are sent and received through the PCell during radio connection (re)-establishment (RRC connection Establishment/Re-establishment) (see Non-Patent Literature 1). A DL carrier corresponding to the PCell is a DL primary component carrier (DL PCC) and its corresponding UL carrier is an UL PCC. Similarly, a DL carrier corresponding to the SCell is a DL secondary component carrier (DL SCC) and its corresponding UL carrier is an UL SCC.

In order to enable a UE to use a SCell in CA, an eNB notifies the UE of configuration information (SCell configuration) of candidate cell(s) for the SCell and activates a cell that is actually used by the UE. A procedure of addition, release, activation, and deactivation of a SCell will be described with reference to FIG. 17.

In step S1, a UE establishes RRC connection in Cell1 of a NB (RRC connection establishment). The Cell1 is the PCell. In step S2, the eNB transmits, to the UE, configuration information including a list of cells (in this example, Cell2 and Cell3) to be added as SCells (RRC Connection Reconfiguration including SCell addition list). In step S3, the UE adds the Cell2 and Cell3 as SCells (SCell=Cell2, 3 addition). At this time point, the UE cannot transmit or receive data in the Cell2 and Cell3. In step S4, the eNB transmits an instruction to activate the Cell2 as a SCell (SCell=Cell2 Activation Control). In step S5, the UE activates the Cell2 (SCell=Cell2 activation). In this way, in step S6, the UE and the eNB transmit and receive data using the Cell1 and Cell2 (Carrier Aggregation on Cell1 and Cell2).

At a certain time point (step S7), the eNB determines to use the Cell3 as a SCell instead of the Cell2 and transmits an instruction to deactivate the Cell2 and an instruction to activate the Cell3 to the UE (SCell=Cell2 Deactivation Control and SCell=Cell3 Activation Control). In steps S8 and S9, the UE deactivates the Cell2 (SCell=Cell2 deactivation) and activates the Cell3 (SCell=Cell3 activation). In this way, in step S10, the UE and the eNB transmit and receive data using the Cell1 and Cell3 (Carrier Aggregation on Cell1 and Cell3).

At a certain time point (step S11), the eNB determines that Carrier Aggregation is not necessary and transmits an instruction to release SCells to the UE (RRC Connection Reconfiguration including SCell release list). In step S12, the UE releases the Cell2 and Cell3 from SCells (SCell=Cell2, 3 release).

Moreover, a concept of Inter-eNB CA of aggregating a plurality of cells served by different eNBs has been proposed (Non-Patent Literature 3). For example, the Inter-eNB CA may use a macro cell served by a macro base station (Macro eNB (MeNB)) and a pico cell served by a pico base station (Pico eNB (PeNB)).

Further, a method has been proposed in which signals for control-plane including mobility management of a UE are transmitted and received using a macro cell having a wide coverage and data-plane signals such as user data are transmitted and received using a pico cell which provides relatively better communication quality (Non-Patent Literature 4). This method is referred to as C/U Split.

CITATION LIST

Non Patent Literature

[Non-Patent Literature 1] 3GPP TS 36.300 V11.3.0, "Evolved Universal Terrestrial Radio Access (E-UTRA) and Evolved Universal Terrestrial Radio Access Network (E-UTRAN); Overall description; Stage 2," Section 7.5, September 2012

[Non-Patent Literature 2] 3GPP TS 36.331 V11.1.0, "Evolved Universal Terrestrial Radio Access (E-UTRA); Radio Resource Control (RRC); Protocol specification," Section 5.3.5.4, September 2012

[Non-Patent Literature 3] 3GPP RWS-120046, Samsung Electronics, "Technologies for Rel-12 and Onwards," 3GPP TSG RAN Workshop on Rel-12 and Onwards Ljubljana, Slovenia, 11-12 Jun. 2012

[Non-Patent Literature 4] 3GPP RWS-120010, NTT DOCOMO, "Requirements, Candidate Solutions & Technology Roadmap for LTE Rel-12 Onward," 3GPP TSG RAN Workshop on Rel-12 and Onwards Ljubljana, Slovenia, 11-12 Jun. 2012

SUMMARY OF INVENTION

Technical Problem

In the Inter-eNB CA, for example, a cell of the macro base station (Macro eNB (MeNB)) and a cell of a low-power base station (Low-Power Node (LPN)) are used simultaneously as a PCell and a SCell, respectively. In this case, bearers are separately configured in the PCell and the SCell. The UE communicates with the MeNB through a bearer in the PCell and communicates with the LPN through the bearer in the SCell.

The inventors of this application has conducted various studies on the continuity of communication services when a radio terminal (UE) that is executing Inter-eNB CA moves between cells and has found several problems. For example, a case in which a UE that is executing Inter-eNB CA using a cell of a MeNB as a PCell and using a cell of a first LPN as a SCell changes the SCell to a cell of another second LPN will be considered. When a SCell change procedure (FIG. 17) in normal CA (i.e., Intra-eNB CA) is applied to this change of the SCell, the UE has to release all information regarding the cell of the first LPN and to newly configure information regarding the cell of the second LPN. Thus, a problem occurs in that communication services in the cell of the first LPN cannot be continued in the cell of the second LPN after the SCell is changed.

Accordingly, an object of the present invention is to provide a radio communication system, a radio station, a radio terminal, a communication control method, and a program which contribute to enabling a communication service in a secondary cell to be continued after the secondary cell is changed when a radio terminal which is simultaneously using a plurality of cells served by different radio stations changes the secondary cell from a cell of one radio station to a cell of another radio station.

Solution to Problem

In a first aspect, a radio communication system includes a radio terminal and a radio network including first to third radio stations. The first to third radio stations serve first to third cells, respectively. The radio terminal has a capability of, while using a cell of one radio station as a primary cell, using a cell of another radio station as a secondary cell. Furthermore, the radio network and the radio terminal are configured to, when the radio terminal is using the first cell as the primary cell and the second cell as the secondary cell, change the secondary cell from the second cell to the third cell while keeping communication status information regarding the radio terminal on the second cell.

In a second aspect, a first radio station includes a radio communication unit that serves a first cell, and a communication control unit. The communication control unit is configured to, when changing a secondary cell to a third cell served by a third radio station while a radio terminal is using the first cell as a primary cell and using a second cell served by a second radio station as the secondary cell, perform at least one of: (a) sending a request to abort data communication with the radio terminal in the second cell; and (b) receiving or sending communication status information regarding the radio terminal on the second cell.

In a third aspect, a second radio station includes a radio communication unit that serves a second cell, and a communication control unit. The communication control unit is configured to, when changing a secondary cell to a third cell served by a third radio station while a radio terminal is using a first cell served by a first radio station as a primary cell and using the second cell as the secondary cell, receive at least one of: (a) a request to abort data communication with the radio terminal in the second cell; and (b) a request to send communication status information regarding the radio terminal on the second cell, and perform at least one of aborting the data communication and sending the communication status information.

In a fourth aspect, a third radio station includes a radio communication unit that serves a third cell, and a communication control unit. The communication control unit is configured to, when changing a secondary cell to the third cell while a radio terminal is using a first cell served by a first radio station as a primary cell and a second cell served by a second radio station as the secondary cell, receive, from the first radio station or the second radio station, communication status information regarding the radio terminal on the second cell.

In a fifth aspect, a radio terminal includes radio communication unit configured to communicate with first to third radio stations, and a communication control unit. The communication control unit is configured to perform control of, while using a first cell of the first radio station as a primary cell, using a second cell served by the second radio station as a secondary cell. The communication control unit is further configured to, when the first cell is being used as the primary cell and the second cell is being used as the secondary cell, change the secondary cell from the second cell to a third cell served by the third radio station while keeping communication status information on the second cell.

In a sixth aspect, a communication control method, in a first radio station that serves a first cell, includes when changing a secondary cell to a third cell served by a third radio station while a radio terminal is using the first cell as a primary cell and using a second cell served by a second radio station as the secondary cell, performing at least one of: (a) sending a request to abort data communication with the radio terminal in the second cell; and (b) receiving or sending communication status information regarding the radio terminal on the second cell.

In a seventh aspect, a communication control method, in a second radio station that serves a second cell, includes: when changing a secondary cell to a third cell served by a third radio station while a radio terminal is using a first cell served by a first radio station as a primary cell and using the second cell as the secondary cell, receiving at least one of (a) a request to abort data communication with the radio terminal in the second cell and (b) a request to send communication status information regarding the radio terminal on the second cell; and performing at least one of aborting the data communication and sending the communication status information.

In an eighth aspect, a communication control method, in a third radio station that serves a third cell, includes when changing a secondary cell to the third cell while a radio terminal is using a first cell served by a first radio station as a primary cell and a second cell served by a second radio station as the secondary cell, receiving, from the first radio station or the second radio station, communication status information regarding the radio terminal on the second cell.

In a ninth aspect, a communication control method, in a radio terminal, includes: (a) while using a first cell of a first radio station as a primary cell, using a second cell served by a second radio station as a secondary cell; and (b) when the first cell is being used as the primary cell and the second cell is being used as the secondary cell, changing the secondary cell from the second cell to a third cell served by a third radio station while keeping communication status information on the second cell.

In a tenth aspect, a program includes instructions for causing a computer to perform the communication control method according to the sixth aspect described above.

In an eleventh aspect, a program includes instructions for causing a computer to perform the communication control method according to the seventh aspect described above.

In a twelfth aspect, a program includes instructions for causing a computer to perform the communication control method according to the eighth aspect described above.

In a thirteenth aspect, a program includes instructions for causing a computer to perform the communication control method according to the ninth aspect described above.

Advantageous Effects of Invention

According to the aspects, it is possible to provide a radio communication system, a radio station, a radio terminal, a communication control method, and a program capable of enabling a communication service in a secondary cell to be continued after the secondary cell is changed when a radio terminal which is simultaneously using a plurality of cells served by different radio stations changes the secondary cell from a cell of one radio station to a cell of another radio station.

DESCRIPTION OF EMBODIMENTS

Figure 1:
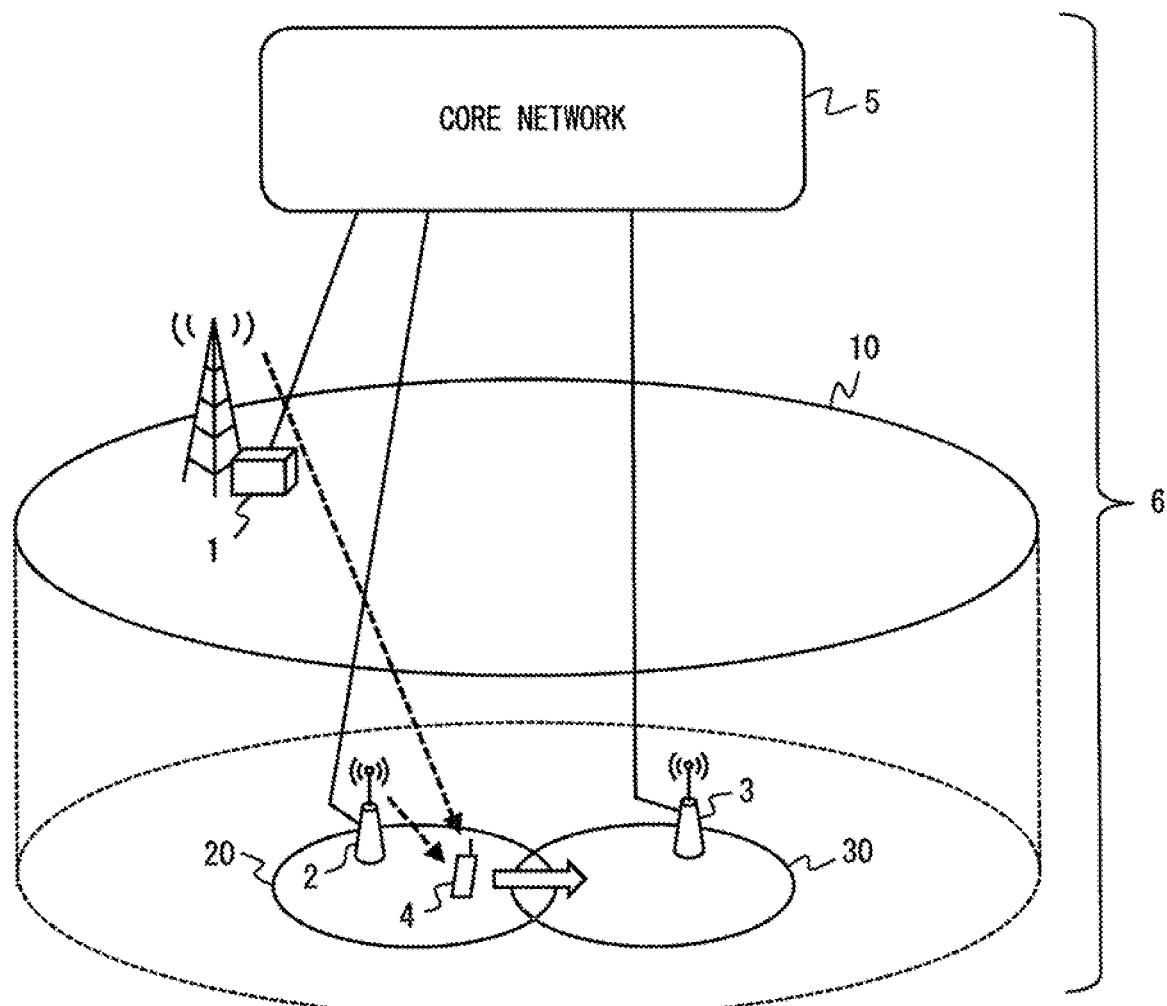
FIG. 1 is a diagram illustrating a configuration example of a radio communication system according to a first embodiment.

Hereinafter, specific embodiments will be described in detail with reference to the drawings. In the respective drawings, the same or corresponding elements are denoted by the same reference numerals, and redundant description thereof will not be provided as necessary in order to clarify the description.

First Embodiment

FIG. 1 illustrates a configuration example of a radio communication system according to this embodiment. The radio communication system according to this embodiment includes a radio network 6 and a radio terminal 4. The radio network 6 includes a first radio station 1, a second radio station 2, a third radio station 3, and a core network 5 connected to the radio stations 1 to 3. The radio stations 1, 2, and 3 serve a first cell 10, a second cell 20, and a third cell 30, respectively. The radio stations 1 to 3 are, for example, radio base stations or base station controllers. The radio terminal 4 has a capability of using a cell of another radio station as a secondary cell (SCell) while using a cell of one radio station as a primary cell (PCell). In other words, the radio terminal 4 supports carrier aggregation on a plurality of cells which is served by different radio stations. The primary cell (PCell) is a cell which has already been used as a serving cell of the radio terminal 4 at the start of carrier aggregation. The secondary cell (SCell) is a cell which is additionally or subordinately used for the carrier aggregation in the radio terminal 4.

For example, the radio terminal 4 can establish a second radio connection in the second cell 20 while maintaining a first radio connection in the first cell 10 and can use the first cell 10 as the primary cell (PCell) and the second cell 20 as the secondary cell (SCell). In this way, the radio terminal 4 can use a plurality of cells (e.g., the cells 10 and 20) simultaneously in order to transmit or receive signals (e.g., user data or control information). The expression "use a plurality of cells simultaneously" is not limited to a case in which signals are actually received or transmitted simultaneously in the plurality of cells. The expression may refer to a case in which signals are received or transmitted in only one or several cells actually although a state where signals can be received or transmitted in all of the plurality of cells is created. The expression may also refer to a case in which different kinds of signals are received or transmitted in respective cells. Alternatively, the expression may refer to a case in which each of the plurality of cells is used for either receiving or transmitting signals. From the perspective of carrier aggregation on a plurality of cells served by different radio stations, the capability of using a plurality of cells served by different radio stations can be referred to as inter-radio station carrier aggregation. Moreover, from the perspective of simultaneous use of a plurality of cells, the capability of using a plurality of cells served by different radio stations can be referred to as Dual Connection, Dual Connectivity, Multi-Connection, Multi-Connectivity, or the like.

The radio terminal 4 may transmit to a radio station a terminal capability report indicating that inter-radio station carrier aggregation is supported, or may implicitly indicate that inter-radio station carrier aggregation is supported by the category, the device release number, or the like of the radio terminal 4. Moreover, as described above, the capability of inter-radio station carrier aggregation can be referred to as dual connection capability or multi-connection capability.

FIG. 1 illustrates a heterogeneous network (HetNet) environment. Specifically, the first cell 10 illustrated in FIG. 1 has a wider coverage than the second cell 20 and the third cell 30. Specifically, the first cell 10 illustrated in FIG. 1 has a wider coverage than the second cell 20 and the third cell 30. Moreover, FIG. 1 illustrates a hierarchical cell structure in which the second cell 20 and the third cell 30 are deployed in the first cell 10. However, the cell structure illustrated in FIG. 1 is an example only. In some implementations, the cells 10, 20, and 30 may have the same degree of coverage. In other words, the radio communication system according to this embodiment may be applied to a homogeneous network environment.

The radio communication system according to this embodiment operates in the following manner in order to enable a data communication (also referred to as data communication service, communication service, or simply service) which has been provided in the SCell (i.e., the cell 20) to be continued even after the SCell is changed from the cell 20 to the cell 30 when the radio terminal 4 is executing inter-radio station carrier aggregation on the cells 10 and 20. That is, when the radio terminal 4 is using the first cell 10 as the PCell and the second cell 20 as the SCell, the radio terminal 4 and the radio network 6 execute a procedure for changing the SCell from the second cell 20 to the third cell 30 while keeping (storing) communication status information regarding the radio terminal 4 on the second cell 20. The radio terminal 4 and the radio network 6 may keep the communication status information on the cell 20 without releasing it during execution of the SCell change procedure. Here, the continuity of data communication may mean a strict sense of continuity, or may mean the continuity of services performed by the data communication. Moreover, if transmission of a certain packet through the cell 20 has failed, the continuity of data communication may mean re-transmission of the packet through the cell 20 or 30.

More specifically, when performing the inter-radio station carrier aggregation using the cell 10 as a PCell and the cell 20 as a SCell, the radio terminal 4 changes the SCell from the second cell 20 to the third cell 30 while keeping the communication status information on the second cell 20 (i.e., the SCell). Moreover, after changing the SCell to the third cell 30, the radio terminal 4 resumes communication based on the communication status information kept therein. That is, the radio terminal 4 resumes, in third cell 30, the continuity of data communication (also referred to as data communication service, communication service, or simply service) which has been provided in the second cell 20 as the SCell.

When performing the inter-radio station carrier aggregation with the radio terminal 4, which uses the cell 10 as the PCell and the cell 20 as the SCell, the radio network 6 changes the SCell of the radio terminal 4 from the second cell 20 to the third cell 30 while keeping the communication status information regarding the radio terminal 4 on the second cell 20. Moreover, after changing the SCell of the radio terminal 4 to the third cell 30, the radio network 6 resumes the communication based on the communication status information kept therein. That is, the radio network 6 resumes, in the third cell 30, the continuity of data communication (also referred to as data communication service, communication service, or simply service) which has been provided in the second cell 20 as the SCell.

Accordingly, the radio communication system can allow the continuity of the data communication performed in the cells 10 and 20 even after the SCell is changed to the cell 30 of the radio station 3 when the radio terminal 4 is performing data communication (also referred to as data communication service, communication service, or simply service) using the cell 20 of the radio stations 1 and 2 as the SCell and the SCell, respectively.

In the above description, during execution of the procedure for changing the SCell of the radio terminal 4, the radio terminal 4 and the radio network 6 may continue or suspend the data communication (referred to as data communication service, communication service, or simply service) in the PCell.

In the above description, the third radio station 3 may be the same as the first radio station 1. In other words, the first cell 10 and the third cell 30 may be different cells or sectors provided by one radio station 1.

The communication status information of the SCell (cell 20) kept in the radio terminal 4 and the radio network 6 may be information necessary for allowing the data communication (referred to as data communication service, communication service, or simply service) which has been performed in the SCell (cell 20) before the change to be resumed in the SCell (i.e., the cell 30) after the change. Thus, the communication status information on the SCell may contain, for example, contents similar to communication status information on a source cell which is sent from a source cell radio station to a target cell radio station during a normal handover. The communication status information on the SCell may be referred to as information indicating a communication status or service status of the radio terminal 4 on the SCell. The communication status information on the SCell may be a communication status of each service or may be communication statuses of a plurality of services. The communication status information may include, for example, at least one of the following information elements:

Transmission or reception status of user data (User Plane (U-plane));

Service information;

Bearer information; and

Radio resource configuration information.

Here, the bearer is, for example, a signaling radio bearer (SRB), a data radio bearer (DRB), or a network bearer (S1 bearer, E-RAB, or EPS bearer).

The radio terminal 4 may keep the communication status information on the SCell at the time of changing the SCell in the following manner. The radio terminal 4 may release the bearer (SCell bearer) in the second cell 20 configured for the radio terminal 4 and keep the communication status information. Alternatively, the radio terminal 4 may release the bearer (SCell bearer) in the second cell 20 but may keep the configuration information of the bearer in the second cell and the communication status information. When the SCell bearer is released, the radio terminal 4 may consider and treat the information regarding the SCell bearer as if it were information regarding the bearer (PCell bearer) in the first cell 10 configured for the radio terminal 4. For example, the radio terminal 4 may treat bearer configuration information, excluding radio bearer configuration, similarly to that of the PCell bearer. In other words, processes such as keeping, updating, resetting, or reconfiguring of SCell bearer configuration information may be performed similarly to those of PCell bearer configuration information. The PCell bearer (or the SCell bearer) may be, but is not limited to, a radio bearer or a network bearer configured in the PCell (or the SCell), for example.

The radio network 6 may keep the communication status information on the SCell by the same method as the radio terminal 4. That is, the radio network 6 may release the bearer (SCell bearer) in the second cell 20 configured for the radio terminal 4 and may keep the communication status information. Alternatively, the radio network 6 may release the bearer (SCell bearer) in the second cell 20 but may keep the configuration information regarding the bearer in the second cell and the communication status information. When the SCell bearer is released, the radio network 6 may reconfigure the released SCell bearer as the bearer (PCell bearer) in the first cell 10 to thereby treat the released SCell bearer as the PCell bearer. For example, the radio network 6 may change the SCell bearer to the PCell bearer by switching the path (route) of the SCell bearer to the PCell and may inherit the configuration information regarding the SCell bearer to the PCell bearer. That is, the bearer configuration information regarding the SCell bearer is inherited to the PCell bearer. In this case, radio bearer configuration may be excluded from the inherited information.

Hereinafter, the data communication will be described as a broad sense of service. From the perspective of a radio network, the service referred herein includes, but is not limited to, transmission of downlink data and control-plane signaling, reception of uplink data and control-plane signaling, and transmission and reception of downlink and uplink voice calls. Similarly, from the perspective of a radio terminal, the service includes, but is not limited to, reception of downlink data and control signals, transmission of uplink data and control signals, and reception and transmission of downlink and uplink voice calls. Hereinafter, the embodiments of the present invention are basically described by way of an example of a downlink service. However, the present invention can naturally be applied to an uplink service.

Figure 2:
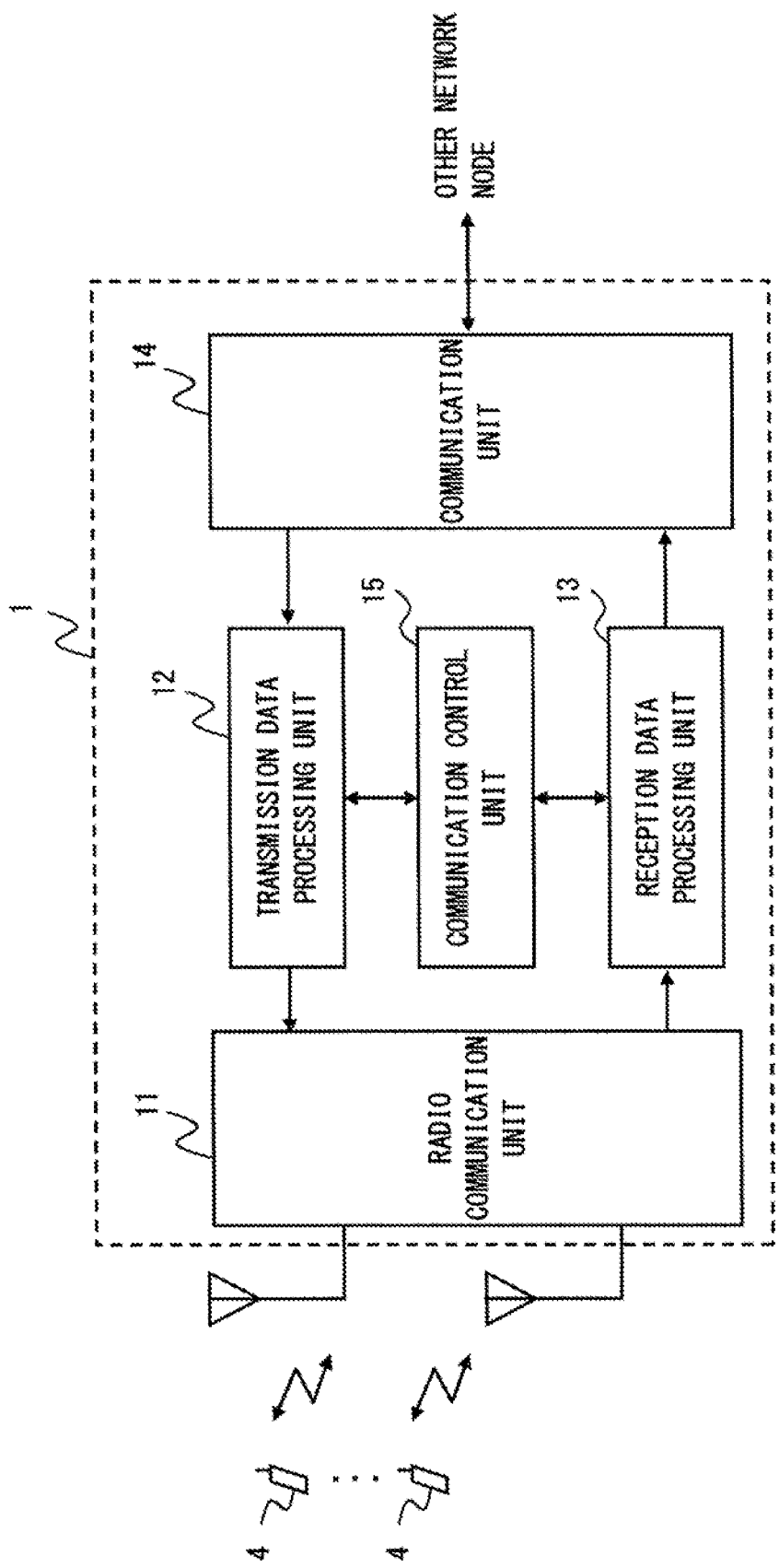
FIG. 2 is a diagram illustrating a configuration example of a first radio station according to the first embodiment.

Next, configuration examples of the radio stations 1 to 3 and the radio terminal 4 according to this embodiment will be described. FIG. 2 is a block diagram illustrating a configuration example of the first radio station 1. A radio communication unit 11 receives an uplink signal transmitted from the radio terminal 4 via an antenna. A reception data processing unit 13 restores the received uplink signal. Obtained received data is transferred to another network node (e.g., a data transfer apparatus or a mobility management apparatus in the core network 5) or another radio station via a communication unit 14. For example, uplink user data received from the radio terminal 4 is transferred to a data transfer apparatus in the core network 5. Moreover, non-access stratum (NAS) control data among control data received from the radio terminal 4 is transferred to a mobility management apparatus in the core network 5. Further, the reception data processing unit 13 receives, from a communication control unit 15, control data to be transmitted to the radio station 2 or 3 and sends the control data to the radio station 2 or 3 via the communication unit 14.

A transmission data processing unit 12 acquires user data destined for the radio terminal 4 from the communication unit 14 and performs processes such as error correction coding, rate matching, and interleaving to generate a transport channel. Further, the transmission data processing unit 12 then generates a transmission symbol sequence by adding control information to the data sequence of the transport channel. The radio communication unit 11 generates a downlink signal by performing processing such as carrier wave modulation based on the transmission symbol sequence, frequency conversion, and signal amplification, and transmits the generated downlink signal to the radio terminal 4. Furthermore, the transmission data processing unit 12 receives control data to be transmitted to the radio terminal 4 from the communication control unit 15 and transmits the control data to the radio terminal 4 via the radio communication unit 11.

The communication control unit 15 controls the inter-radio station carrier aggregation which uses the first cell 10 as the PCell and the second cell 20 as the SCell. Further, the communication control unit 15 performs a procedure for changing the SCell of the radio terminal 4 from the second cell 20 to the third cell 30 while keeping the communication status information regarding the radio terminal 4 on the SCell (second cell 20) in the radio network 6 and the radio terminal 4. The communication control unit 15 performs the SCell change procedure in cooperation with the radio station 2, the radio station 3, and the radio terminal 4.

In an example, the communication control unit 15 may receive the communication status information regarding the radio terminal 4 on the SCell (second cell 20) from the second radio station 2, and then send the communication status information to the third radio station 3. Moreover, the communication control unit 15 may request the core network 5 or the second radio station 2 to switch the bearer in the cell 20 (SCell bearer) to the bearer in the cell 10 (PCell bearer). The details of control and signaling performed by the communication control unit 15 will be described later.

Figure 3:
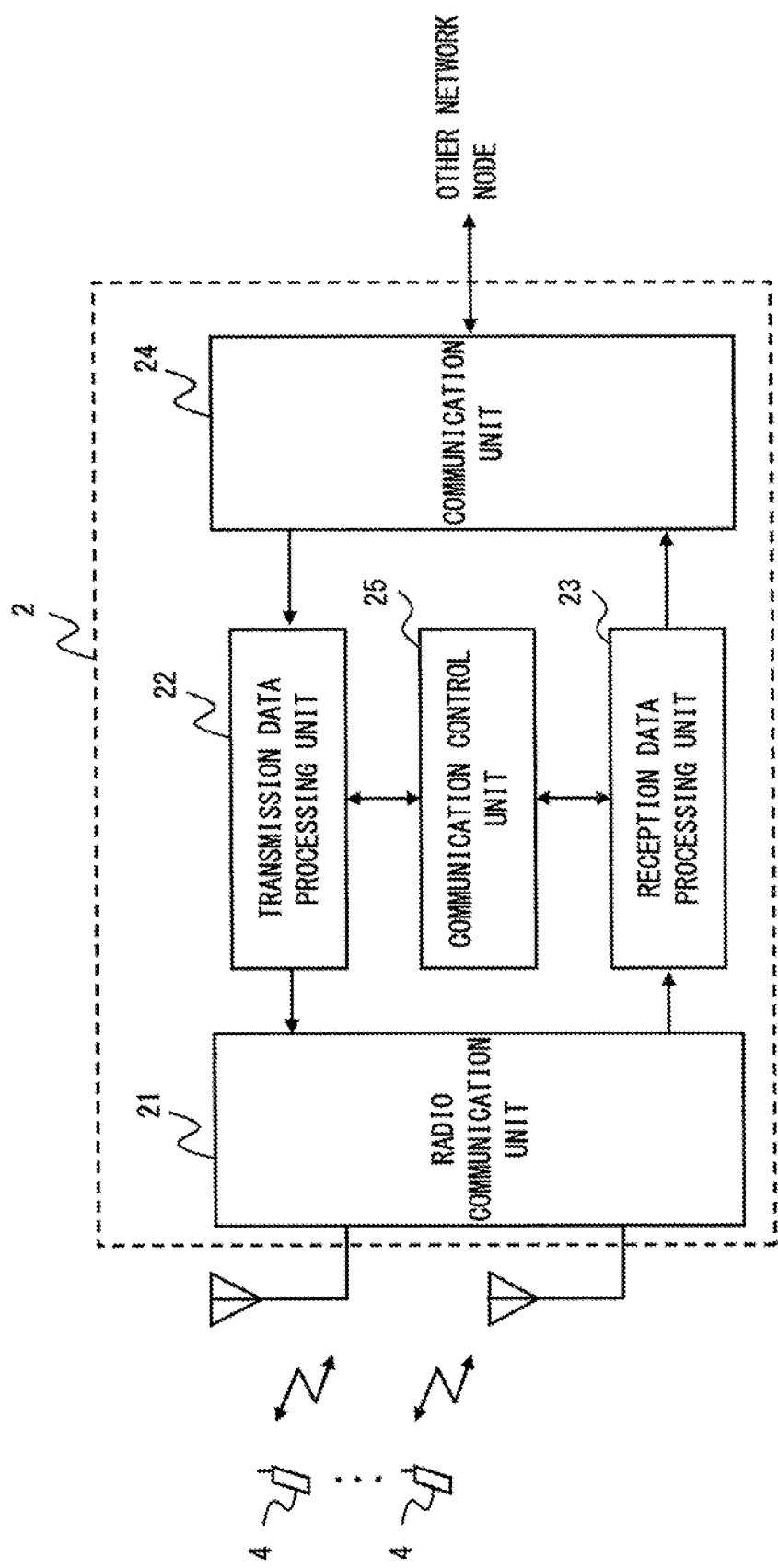
FIG. 3 is a diagram illustrating a configuration example of a second radio station according to the first embodiment.

FIG. 3 is a block diagram illustrating a configuration example of the second radio station 2. The functions and operations of a radio communication unit 21, a transmission data processing unit 22, a reception data processing unit 23, and a communication unit 24 illustrated in FIG. 3 are similar to those of the corresponding elements of the radio station 1 illustrated in FIG. 2, i.e., the radio communication unit 11, the transmission data processing unit 12, the reception data processing unit 13, and the communication unit 14.

A communication control unit 25 of the radio station 2 controls the inter-radio station carrier aggregation which uses the first cell 10 as the PCell and the second cell 20 as the SCell. Further, the communication control unit 25 performs a procedure for changing the SCell of the radio terminal 4 from the second cell 20 to the third cell 30 while keeping the communication status information regarding the radio terminal 4 on the SCell (second cell 20) in the radio network 6 and the radio terminal 4. The communication control unit 25 performs the SCell change procedure in cooperation with the radio station 1, the radio station 3, and the radio terminal 4.

In an example, the communication control unit 25 may operate so as to send the communication status information regarding the radio terminal 4 on the SCell (second cell 20) to the first radio station 1, the third radio station 3, or the core network 5. The communication control unit 25 may abort the provision of a service to the radio terminal 4 in the SCell (second cell 20), keep the communication status information regarding the radio terminal 4 on the second cell 20 even after the service is aborted rather than releasing (deleting) the communication status information, and send the communication status information to the first radio station 1, the third radio station 3, or the core network 5 after the SCell is changed to the third cell 30. Further, the communication control unit 25 may request the core network 5 or the first radio station 1 to switch a bearer in the cell 20 (referred to as a SCell bearer or a secondary bearer) to a bearer in the cell 10 (referred to as a PCell bearer or a primary bearer). The details of control and signaling performed by the communication control unit 25 will be described later.

Figure 4:
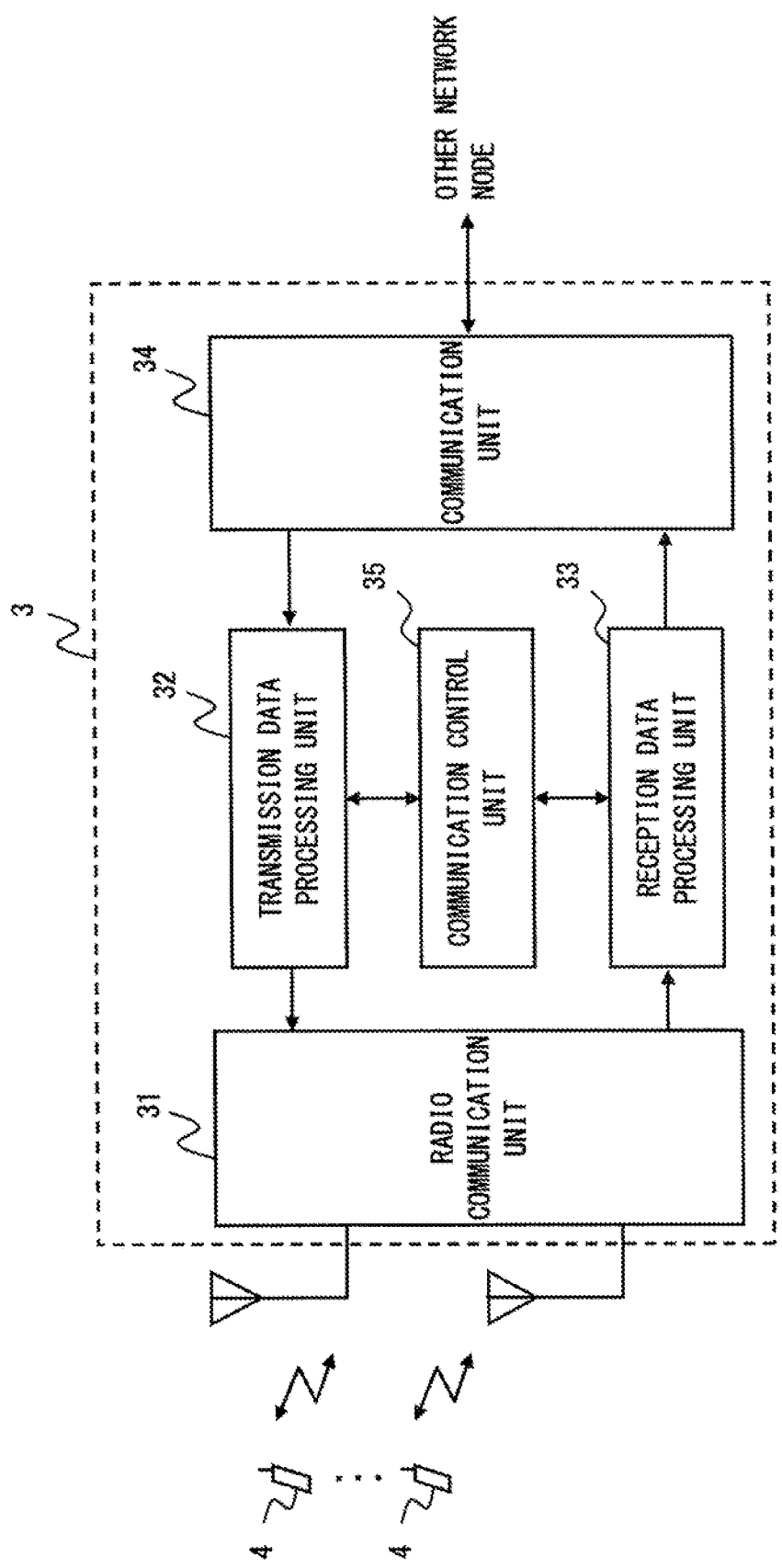
FIG. 4 is a diagram illustrating a configuration example of a third radio station according to the first embodiment.

FIG. 4 is a block diagram illustrating a configuration example of the third radio station 3. The function and operation of a radio communication unit 31, a transmission data processing unit 32, a reception data processing unit 33, and a communication unit 34 illustrated in FIG. 4 are similar to those of the corresponding elements of the radio station 1 illustrated in FIG. 2, i.e., the radio communication unit 11, the transmission data processing unit 12, the reception data processing unit 13, and the communication unit 14.

The communication control unit 35 of the radio station 3 performs a procedure for changing the SCell of the radio terminal 4 from the second cell 20 to the third cell 30 while keeping the communication status information regarding the radio terminal 4 on the SCell (second cell 20) in the radio network 6 and the radio terminal 4. The communication control unit 35 performs the SCell change procedure in cooperation with the radio station 1, the radio station 2, and the radio terminal 4.

In an example, the communication control unit 35 may receive the communication status information regarding the radio terminal 4 on the SCell (second cell 20) from the first radio station 1, the second radio station, or the core network 5. The communication control unit 35 may perform control so as to allow the service, which has been provided in the SCell before change (i.e., the second cell 20), to be provided in the SCell after change (i.e., the third cell 30) based on the communication status information on the SCell. The details of control and signaling performed by the communication control unit 35 will be described later.

Figure 5:
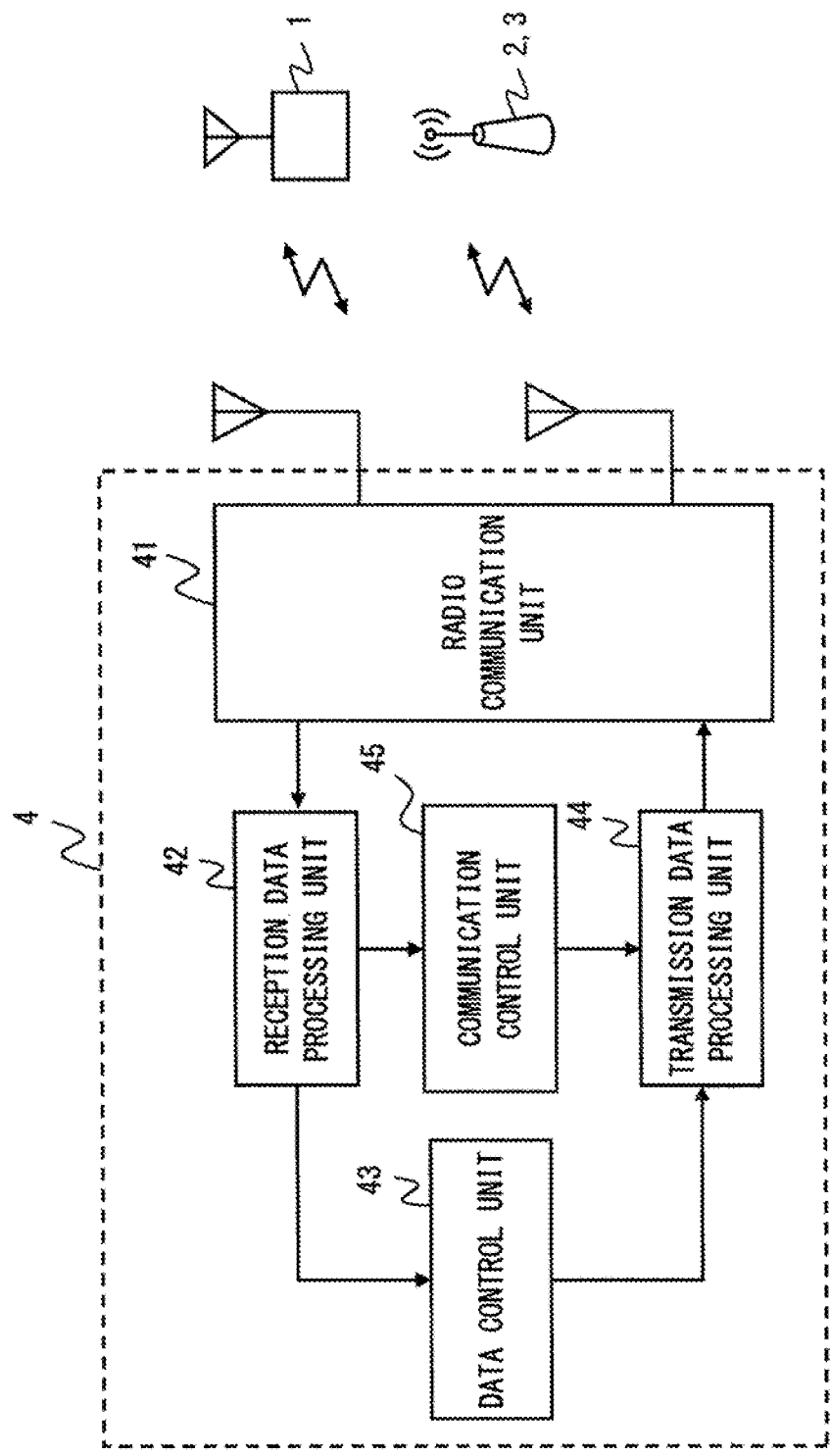
FIG. 5 is a diagram illustrating a configuration example of a radio terminal according to the first embodiment.

FIG. 5 is a block diagram illustrating a configuration example of the radio terminal 4. The radio communication unit 41 supports carrier aggregation on a plurality of cells served by different radio stations and can use the plurality of cells (e.g., the cells 10 and 20) simultaneously in order to transmit or receive user data. Specifically, the radio communication unit 41 receives a downlink signal from the radio station 1, the radio station 2, or the radio station 3 via an antenna. The reception data processing unit 42 restores received data from the received downlink signal, and sends the received data to a data control unit 43. The data control unit 43 uses the received data according to the purpose thereof. A transmission data processing unit 44 and the radio communication unit 41 generate an uplink signal using transmission data supplied from the data control unit 43, and transmit the uplink signal to the radio station 1, the radio station 2, or the radio station 3.

The communication control unit 45 controls the inter-radio station carrier aggregation which uses the first cell 10 as a PCell and the second cell 20 as a SCell. Further, the communication control unit 45 performs a procedure for changing the SCell of the radio terminal 4 from the second cell 20 to the third cell 30 while keeping the communication status information regarding the radio terminal 4 on the SCell (second cell 20) in the radio network 6 and the radio terminal 4. The communication control unit 45 performs the SCell change procedure in cooperation with the radio station 1, the radio station 2, and the radio station 3.

In an example, the communication control unit 45 may change the SCell from the second cell 20 to the third cell 30 while keeping the communication status information regarding the radio terminal 4 on the SCell (second cell 20). Specifically, the communication control unit 45 may keep the communication status information regarding the radio terminal 4 on the SCell (second cell 20) without releasing the communication status information during the execution of the SCell change procedure. The communication control unit 45 may resume, in the SCell after the change (i.e., third cell 30), the service which has been provided in the SCell before the change (i.e., the second cell 20). The details of control and signaling performed by the communication control unit 45 will be described later.

Hereinafter, Procedure Examples 1 and 2 of a communication control method in the radio communication system according to this embodiment will be described.

Procedure Example 1

In Procedure Example 1, the radio terminal 4 and the radio network 6 keep the communication status information regarding the radio terminal 4 on the SCell before the change (i.e., the second cell 20) while changing the SCell of the radio terminal 4 from the second cell 20 to the third cell 30, and then resume, in the SCell after the change (i.e., third cell 30), communication (service) which has been provided in the SCell before the change (i.e., the second cell 20).

Figure 6:
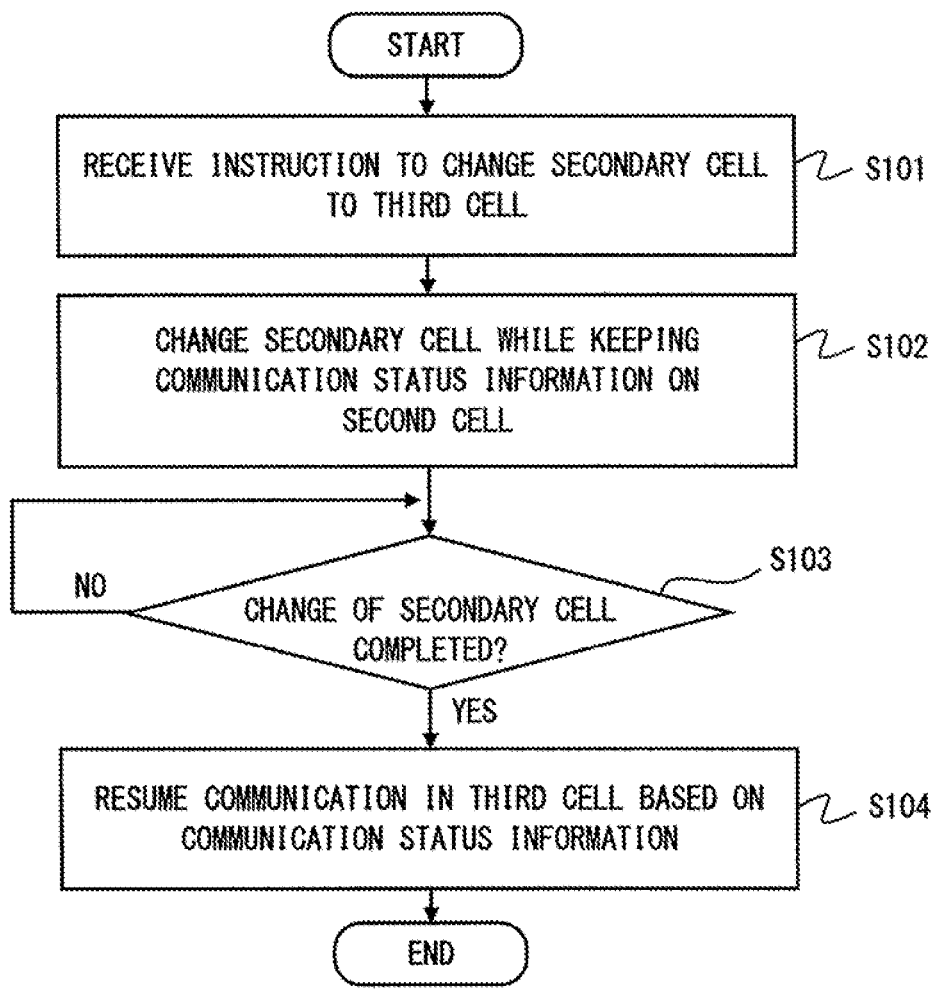
FIG. 6 is a flowchart illustrating an operation example of a radio terminal according to the first embodiment (Procedure Example 1).

FIG. 6 is a flowchart illustrating an example of an operation of the radio terminal 4 according to Procedure Example 1. In step S101, the radio terminal 4 (communication control unit 45) receives from the radio network 6 an instruction to change the SCell to the third cell 30. In step S102, the radio terminal 4 (communication control unit 45) initiates a procedure for changing the SCell to the cell 30 while keeping the communication status information on the cell 20. When the change of the SCell is completed (YES in step S103), the radio terminal 4 (communication control unit 45) resumes the communication of the SCell in the cell 30 based on the kept communication status information on the cell 20. The resumed communication includes a communication which has been performed in the SCell before the change (i.e., the cell 20).

Figure 7:
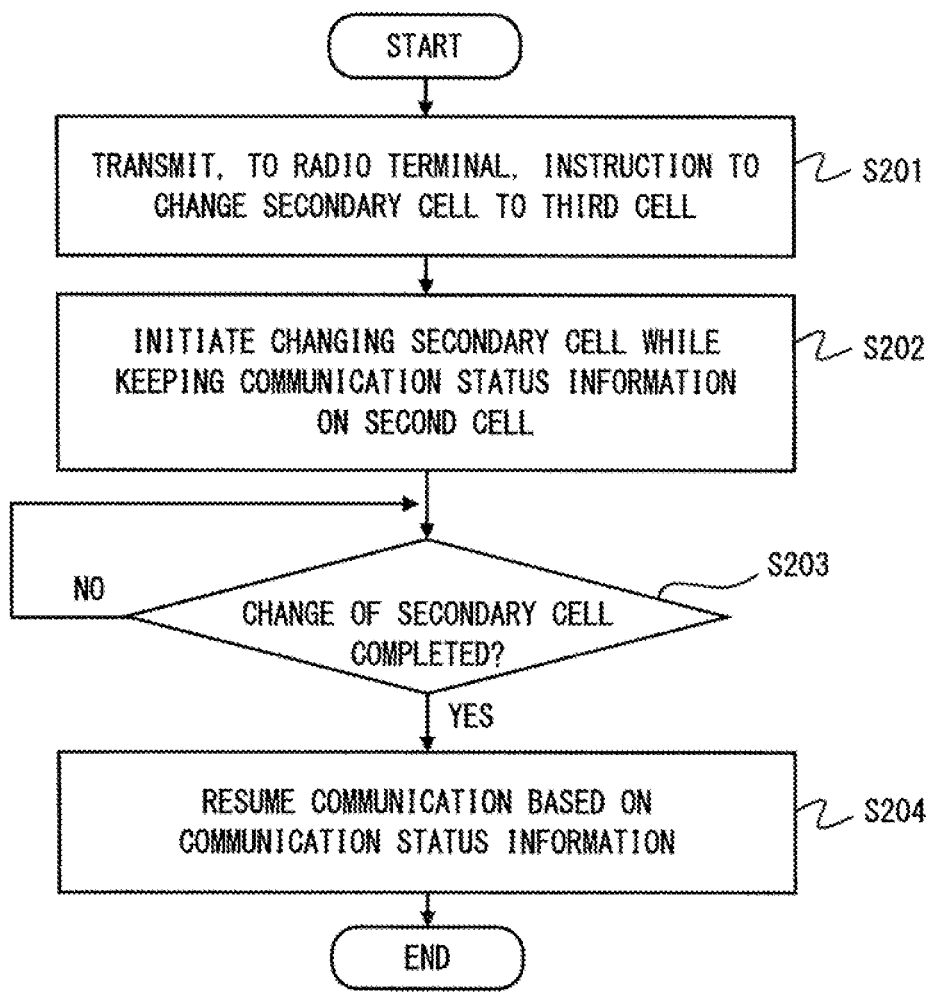
FIG. 7 is a flowchart illustrating an operation example of a radio network according to the first embodiment (Procedure Example 1).

FIG. 7 is a flowchart illustrating an example of an operation of the radio network 6 according to Procedure Example 1. In step S201, the radio network 6 (e.g., the communication control unit 15 of the radio station 1) transmits, to the radio terminal 4, an instruction to change the SCell to the third cell 30. In step S202, while keeping the communication control information regarding the radio terminal 4 on the cell 20, the radio network 6 (e.g., the communication control unit 15 of the radio station 1, the communication control unit 25 of the radio station 2, and the communication control unit 35 of the radio station 3) initiates a procedure for changing the SCell of the radio terminal 4 to the cell 30. When the change of the SCell is completed (YES in step S203), the radio network 6 (communication control unit 35) resumes the communication of the radio terminal 4 in the SCell after the change (i.e., the cell 30) based on the kept communication status information regarding the radio terminal 4 on the cell 20. The resumed communication includes a communication which has been performed in the SCell before the change (i.e., the cell 20).

Figure 8:
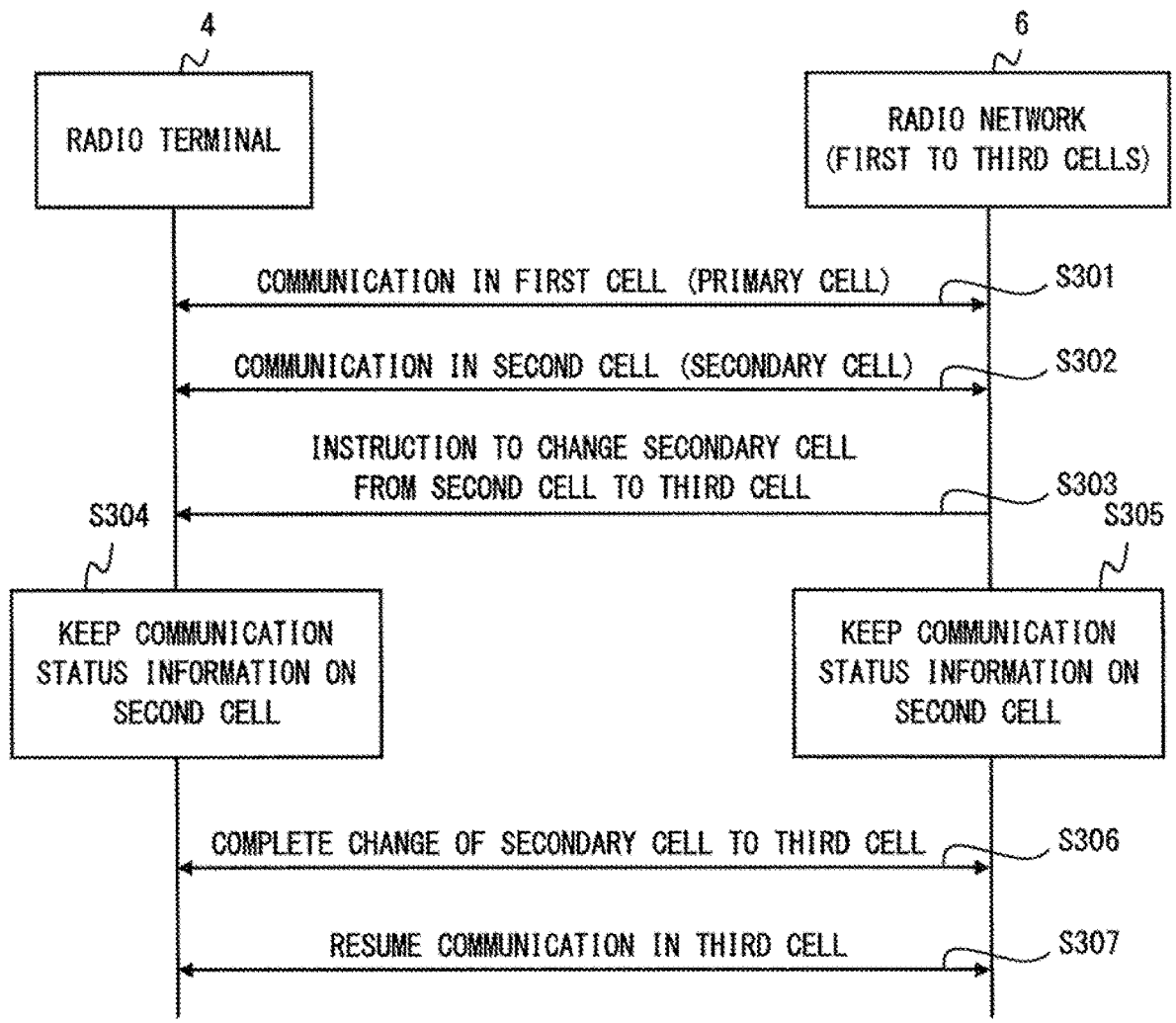
FIG. 8 is a sequence diagram illustrating an example of a communication control method in the radio communication system according to the first embodiment (Procedure Example 1).

FIG. 8 is an example of a sequence diagram illustrating the entire process of Procedure Example 1. In steps S301 and S302, the radio network 6 and the radio terminal 4 performs communication (inter-radio station carrier aggregation) using the first cell 10 as the PCell and the second cell 20 as the SCell. In step S303, the radio network 6 transmits, to the radio terminal 4, an instruction to change the SCell from the cell 10 to the cell 30. In step S304, the radio terminal 4 initiates changing the SCell to the cell 30 while keeping the communication status information on the cell 20. The radio network 6 also keeps the communication status information regarding the radio terminal 4 on the cell 20 during the change of the SCell of the radio terminal 4 (step S305). In step S306, the radio network 6 and the radio terminal 4 complete the SCell change of the radio terminal 4 from the cell 20 to the cell 30. In step S307, the radio network 6 and the radio terminal 4 resumes the communication of the radio terminal 4 in the cell 30 based on the kept communication status information regarding the radio terminal 4 on the cell 20. The resumed communication includes a communication which has been performed in the SCell before the change (i.e., the cell 20).

In Procedure Example 1 described above, the first radio station 1 (communication control unit 15) may explicitly inform the radio terminal 4 to keep the communication status information on the second cell 20 (or to perform the SCell change while keeping the communication status information). This notification may be transmitted together with a message of an instruction to change the PCell from the second cell 20 to the third cell 30 or may be transmitted using a message different from the PCell change instruction. Moreover, the first radio station 1 (communication control unit 15) may inform the radio terminal 4 to release a bearer (SCell bearer) in the cell 20, or to keep the bearer configuration information although the SCell bearer is released.

Procedure Example 2

Figure 9:
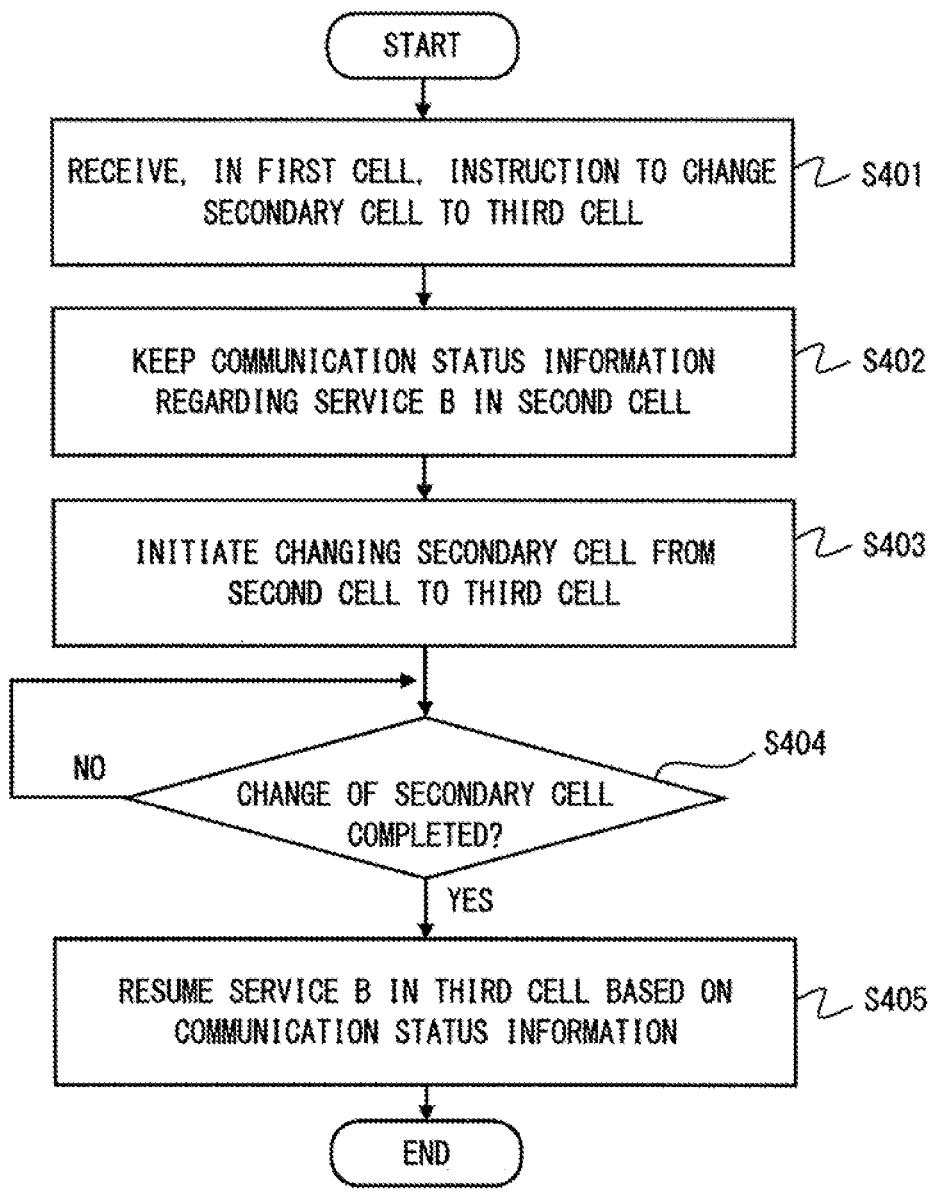
FIG. 9 is a flowchart illustrating an operation example of the radio terminal according to the first embodiment (Procedure Example 2).

Procedure Example 2 corresponds to a more specific example of Procedure Example 1 described above. FIG. 9 is a flowchart illustrating an example of an operation of the radio terminal 4 according to Procedure Example 2. In step S401, the radio terminal 4 (communication control unit 45) receives, on the first cell 10 from the first radio station 1, an instruction to change the SCell to the third cell 30. In step S402, the radio terminal 4 (communication control unit 45) keeps the communication status information of the data communication (service B) which has been provided in the SCell (second cell 20). In step S403, the radio terminal 4 (communication control unit 45) initiates changing the SCell from the second cell 20 to the third cell 30. When the change of the SCell is completed (YES in step S404), the radio terminal 4 (communication control unit 45) continues, in the cell 30, the data communication (service B) which has been performed in the SCell before the change, based on the kept communication status information on the cell 20. That is, the radio terminal 4 (communication control unit 45) resumes the service B.

Figure 10:
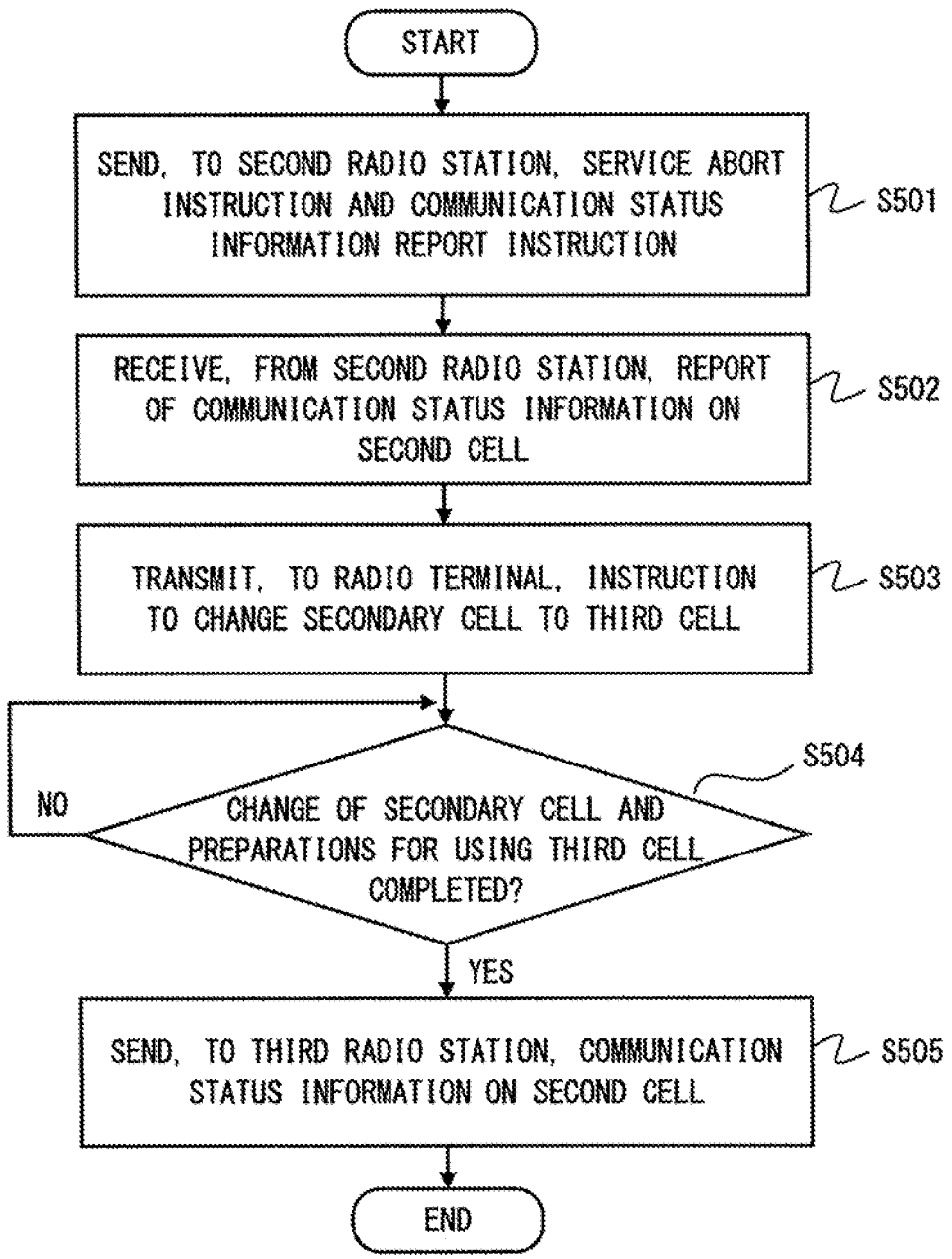
FIG. 10 is a flowchart illustrating an operation example of the first radio station according to the first embodiment (Procedure Example 2).

FIG. 10 is a flowchart illustrating an example of an operation of the first radio station 1 according to Procedure Example 2. In step S501, the radio station 1 (communication control unit 15) sends, to the radio station 2, an instruction to abort the service B for the radio terminal 4 and an instruction to report the communication status information regarding the radio terminal 4. Here, the service abort instruction and the communication status information report instruction may be sent using the same message or may be sent using separate messages. In step S502, the radio station 1 (communication control unit 15) receives, from the radio station 2, the report of the communication status information regarding the radio terminal 4 on the second cell 20. In step S503, the radio station 1 (communication control unit 15) transmits, to the radio terminal 4, an instruction to change the SCell to the third cell 30. In step S504, the radio station 1 (communication control unit 15) determines whether the change of the SCell and the preparation for using the third cell have been completed. When the change of the SCell and the preparation for using the third cell have been completed (YES in step S504), the radio station 1 (communication control unit 15) sends, to the third radio station 3 the communication status information regarding the radio terminal 4 on the second cell 20 (step S505).

In step S501 of FIG. 10, the instruction to the second radio station to abort the service B may be sent using the same or different message from the instruction to report the communication status information on the second cell.

In step S503 of FIG. 10, the instruction to the radio terminal 4 to change the SCell to the third radio station 3 may include configuration information (e.g., radio resource configuration information) of the third cell 30. The configuration information of the third cell 30 may have the same contents as configuration information of the second cell as the SCell. The first radio station 1 may acquire the configuration information of the third cell 30 in advance from the third radio station 3.

In step S504 of FIG. 10, the first radio station 1 may determine the completion of the SCell change based on receiving, from the radio terminal 4, a positive response (ACK) to the SCell change instruction. Alternatively, the first radio station 1 may determine the completion of the SCell change based on receiving, from the radio terminal 4, a message indicating completion of the SCell change.

Transmission of the communication status information of the second cell 20 to the third radio station 3 in step S505 of FIG. 10 may be performed before completion (i.e., before step S504 of FIG. 10) of the SCell change.

Transmission of the communication status information of the second cell 20 to the third radio station 3 (step S505) may be used as an instruction (or a request) to use the third cell 30 as the SCell for the radio terminal 4. However, alternatively, the instruction to use the third cell 30 as the SCell for the radio terminal 4 may be transmitted using separate messages.

Figure 11:
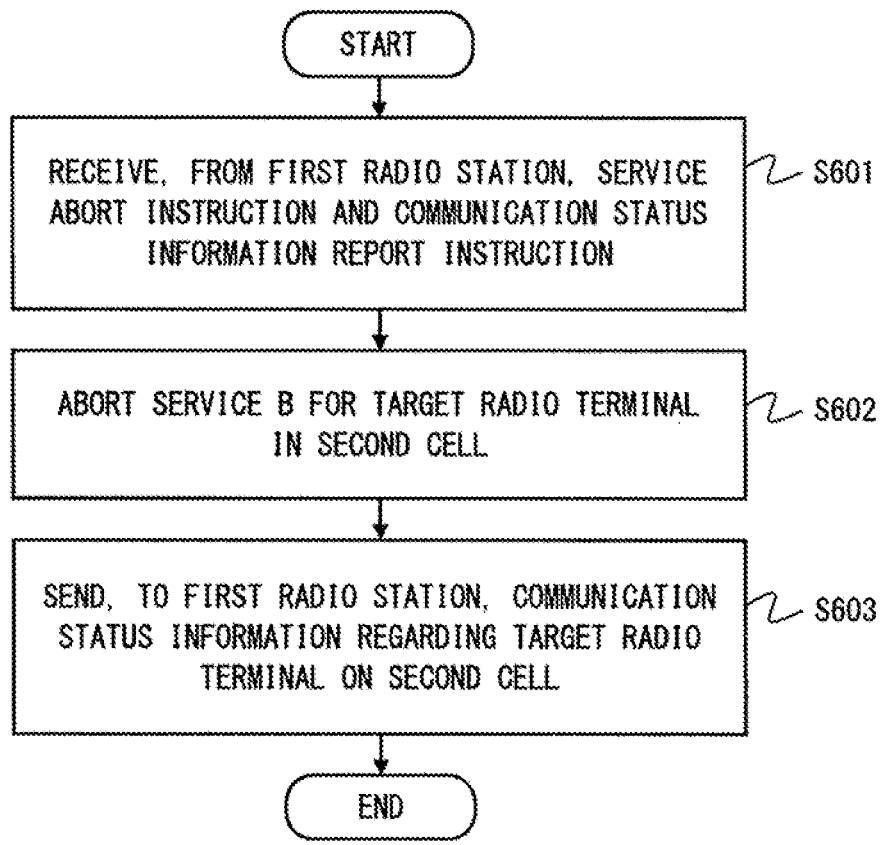
FIG. 11 is a flowchart illustrating an operation example of the second radio station according to the first embodiment (Procedure Example 2).

FIG. 11 is a flowchart illustrating an example of the operation of the second radio station 2 according to Procedure Example 2. In step S601, the radio station 2 (communication control unit 25) receives, from the radio station 1, the instruction to abort the service for a target radio terminal (i.e., the radio terminal 4) and the instruction to report the communication status information regarding the radio terminal 4. In step S602, the radio station 2 (communication control unit 25) aborts the provision of the service to the radio terminal 4 in the second cell 20. In step S603, the radio station 2 (communication control unit 25) sends, to the radio station 1, the communication status information regarding the radio terminal 4 on the second cell 20.

Figure 12:
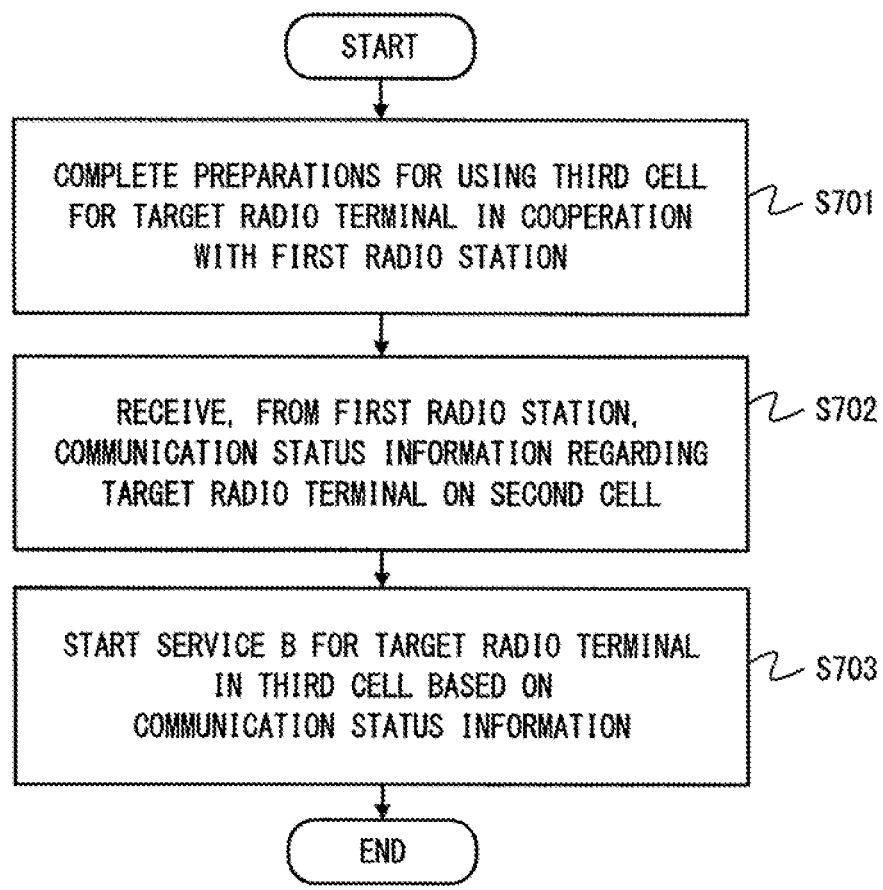
FIG. 12 is a flowchart illustrating an operation example of the third radio station according to the first embodiment (Procedure Example 2).

FIG. 12 is a flowchart illustrating an example of an operation of the third radio station 3 according to Procedure Example 2. In step S701, the radio station 3 (communication control unit 35) completes preparations for allowing a target radio terminal (i.e., the radio terminal 4) to use the third cell 30 as the SCell in cooperation with the first radio station 1. In step S702, the radio station 3 (communication control unit 35) receives, from the radio station 1, the communication status information regarding the radio terminal 4 on the cell 20. In step S703, the radio station 3 (communication control unit 35) resumes, in the third cell 30, the service B which has been performed for the radio terminal 4 in the SCell before the change (i.e., the cell 20) based on the communication status information regarding the radio terminal 4 on the cell 20.

Figure 13:
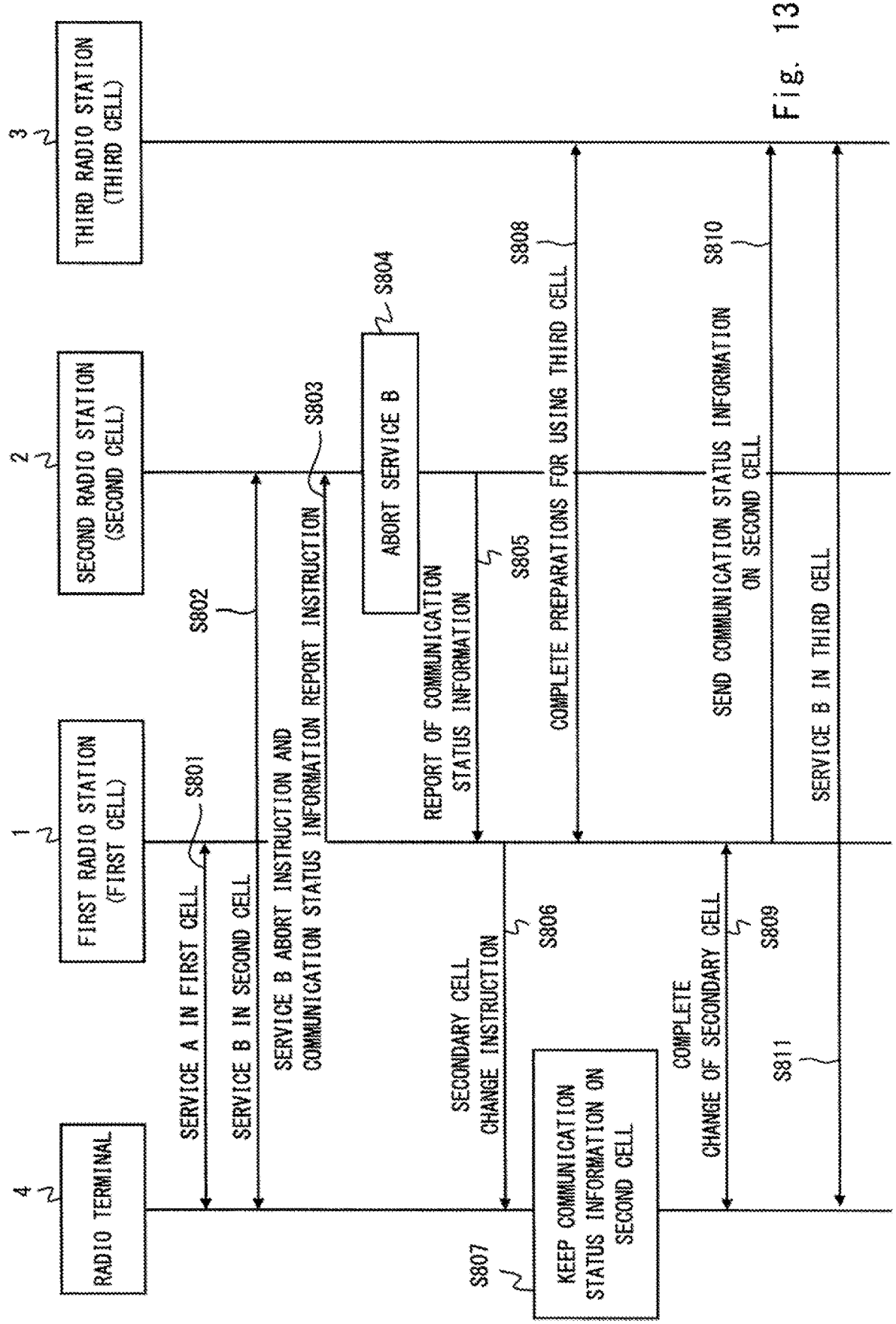
FIG. 13 is a sequence diagram illustrating an example of the communication control method in the radio communication system according to the first embodiment (Procedure Example 2).

FIG. 13 is an example of a sequence diagram illustrating the entire process of Procedure Example 2. In step S801, the radio station 1 and the radio terminal 4 performs communication (service A) using the first cell 10 as the PCell. In step S802, the radio station 2 and the radio terminal 4 performs communication (service B) using the second cell 20 as the SCell. In step S803, the radio station 1 sends, to the radio station 2, an instruction to abort the service B and an instruction to report the communication status information. In step S804, in response to the service abort instruction, the radio station 2 aborts the service B for the radio terminal 4 in the SCell (second cell 20). In step S805, in response to the instruction to report the communication status information, the radio station 2 reports to the radio station 1 the communication status information regarding the radio terminal 4 on the second cell 20.

In step S806, the radio station 1 transmits a SCell change instruction to the radio terminal 4. In step S807, the radio terminal 4 aborts the service B in the second cell 20, keeps the communication status information on the second cell 20, and initiates the procedure for changing the SCell to the third cell 30. In step S808, the radio station 1 and the radio station 3 complete preparations for using the third cell 30. In step S809, the radio station 1 and the radio terminal 4 complete the SCell change from the second cell 20 to the third cell 30. In step S810, the radio station 1 sends, to the radio station 3, the communication status information regarding the radio terminal 4 on the second cell 20. In step S811, the radio station 3 and the radio terminal 4 perform, in the cell 30, the communication (service B) which has been performed in the SCell before the change (i.e., the cell 20).

Modification of Procedure Example 2

In Procedure Example 2 described above, an example in which the communication status information regarding the radio terminal 4 on the second cell 20 is sent from the second radio station 2 to the third radio station 3 via the first radio station 1 has been illustrated. However, alternatively, the second radio station 2 may send the communication status information directly to the third radio station 3 without via the first radio station 1. In an example, the first radio station 1 may request the second radio station 2 to send the communication status information regarding the radio terminal 4 on the second cell 20 to the third radio station 3. In this case, the second radio station 2 may send the communication status information to the third radio station 3 in response to the request from the first radio station 1. In another example, the third radio station 3 may request the second radio station 2 to send the communication status information regarding the radio terminal 4 on the second cell 20. In this case, the second radio station 2 may send the communication status information to the third radio station 3 in response to the request from the third radio station 3.

The communication (service) performed by the radio terminal 4 in Procedure Examples 1 and 2 described above may be data communication (User plane (U-plane)) or may be control-plane signaling (Control plane (C-plane)).

In Procedure Examples 1 and 2 described above, exchange of messages and information between radio stations may be performed through the core network 5.

In Procedure Examples 1 and 2 described above, during execution of the SCell change procedure, the radio terminal 4 and the radio network 6 may continue or suspend the communication (service A) in the PCell.

In Procedure Examples 1 and 2 described above, the instruction to change the SCell to the third cell may be an instruction to change the SCell from the second cell 20 to the third cell 30, or alternatively may be an instruction to delete (or release) the second cell 20 and add (or configure) the third cell 30.

In Procedure Example 2 described above, the service A and the service B may be the same service.

In Procedure Example 2 described above, the radio terminal 4 may execute a plurality of services in the PCell (cell 10). Similarly, the radio terminal 4 may execute a plurality of services in the SCell before the change (i.e., the cell 20). For example, the radio terminal 4 may execute services B and C in the SCell before the change (i.e., the cell 20). The radio terminal 4 may execute, in the SCell after the change (i.e., the cell 30), all of the services (e.g., both services B and C) which have been executed in the SCell before the change (i.e., the cell 20). Alternatively, the radio terminal 4 may execute, in the SCell after the change (i.e., the cell 30), only a part of the services (e.g., the service B only) which have been executed in the SCell before the change (i.e., the cell 20).

Procedure Examples 1 to 2 described above can be applied to, but not limited to, a case in which the first radio station 1 is a radio station that serves (manages) a cell having a relatively large coverage, and the second radio station 2 and the third radio station 3 are low-power radio stations (Low Power Nodes (LPN)) that serve (manage) cells having a small coverage. Examples of a LPN include a radio station having the same functions as the radio station 1 and a new type of network node (New Node) having fewer functions than the radio station 1. Moreover, the second cell 20 and the third cell 30 may be new type cells (New Cell Type) which are different from existing cells and use a new type of carrier (New Carrier Type) different from an existing carrier.

Second Embodiment

In this embodiment, an example in which the first embodiment described above is applied to a 3GPP LTE system will be described. A configuration example of a radio communication system according to this embodiment may be similar to that illustrated in FIG. 1. However, the radio stations 1 to 3 correspond to eNBs, the radio terminal 4 corresponds to a UE, and the core network 5 corresponds to an evolved packet core (EPC). Moreover, eNB1 to eNB3 correspond to a radio access network (RAN). Transmission and reception of information between radio stations (i.e., between eNBs) may use an X2 interface which is a direct interface, may use an S1 interface through a core network, or may use a newly defined interface (e.g., an X3 interface). The radio terminal (UE) 4 supports carrier aggregation (Inter-eNB CA) on a plurality of cells served by different radio stations (eNBs). The expression "Inter-eNB CA" is not limited to a case in which signals are actually received or transmitted in the cells of different eNBs simultaneously. The expression may refer to a case in which signals are received or transmitted in cells of several eNBs actually although a state where signals (e.g., user data or control information) can be received or transmitted in all of the cells of different eNBs is created. The expression may also refer to a case in which different kinds of signals are received or transmitted in respective cells of different eNBs. Alternatively, the expression may refer to a case in which each of the cells of different eNBs is used for either receiving or transmitting signals. In the following description, the radio stations 1 to 3 are referred to as eNB1 to eNB3, the radio terminal 4 are referred to as a UE 4, and the core network 5 will be referred to as an EPC 5.

As described in the first embodiment, the communication status information may include, for example, at least one of the following information elements:

Transmission or reception status of user data (User Plane (U-plane));
Service information;

Bearer information; and

Radio resource configuration information.

The transmission or reception status of user data may be, for example, contents of a SN Status Transfer message that transfers information indicating statuses of a packet data convergence protocol (PDCP) sequence number (SN) and a hyper frame number (HFN). The SN Status Transfer message includes an E-RAB ID, a Receive Status Of UL PDCP SDUs, an UL COUNT Value (PDCP SN+HFN), a DL COUNT Value (PDCP SN+HFN), and the like. Moreover, the transmission or reception status of the user data may be an RLC status (e.g., RLC STATUS PDU).

The service information may include QoS information or a QoS Class Indicator (QCI) value.

The bearer information is information regarding a signaling radio bearer (SRB), a data radio bearer (DRB), or a network bearer (S1 bearer, E-RAB, or EPS bearer). The bearer information may include, for example, a bearer ID (e.g., drb-Identity, eps-Bearer Identity, E-RAB ID), terminal identification information (e.g., eNB UE S1AP ID, MME UE S1AP ID, or TMSI), or network identification information (e.g., GUMMEI, UL GTP Tunnel Endpoint, or DL GTP Tunnel Endpoint).

The radio resource configuration information may include, for example, common radio resource configuration information (Radio Resource Config Common) or dedicated radio resource configuration information (Radio Resource Config Dedicated).

Next, Procedure Examples 3 to 5 of a communication control method in the radio communication system according to this embodiment will be described.

Procedure Example 3

Procedure Example 3 corresponds to Procedure Example 2 described in the first embodiment. That is, when the SCell is changed to the cell 30 of the eNB3 during the period in which the UE 4 experiences the service A in the cell 10 (PCell) of the eNB1 and the service B in the cell 20 (SCell) of the eNB2, the UE 4 and the radio network 6 (i.e., RAN and EPC) perform the SCell change while keeping the communication status information of the UE 4 on the cell 20. Moreover, the UE 4 and the radio network 6 perform the service B in the SCell after the change (i.e., the cell 30). That is, the UE 4 and the radio network 6 resume the service B.

Figure 14:
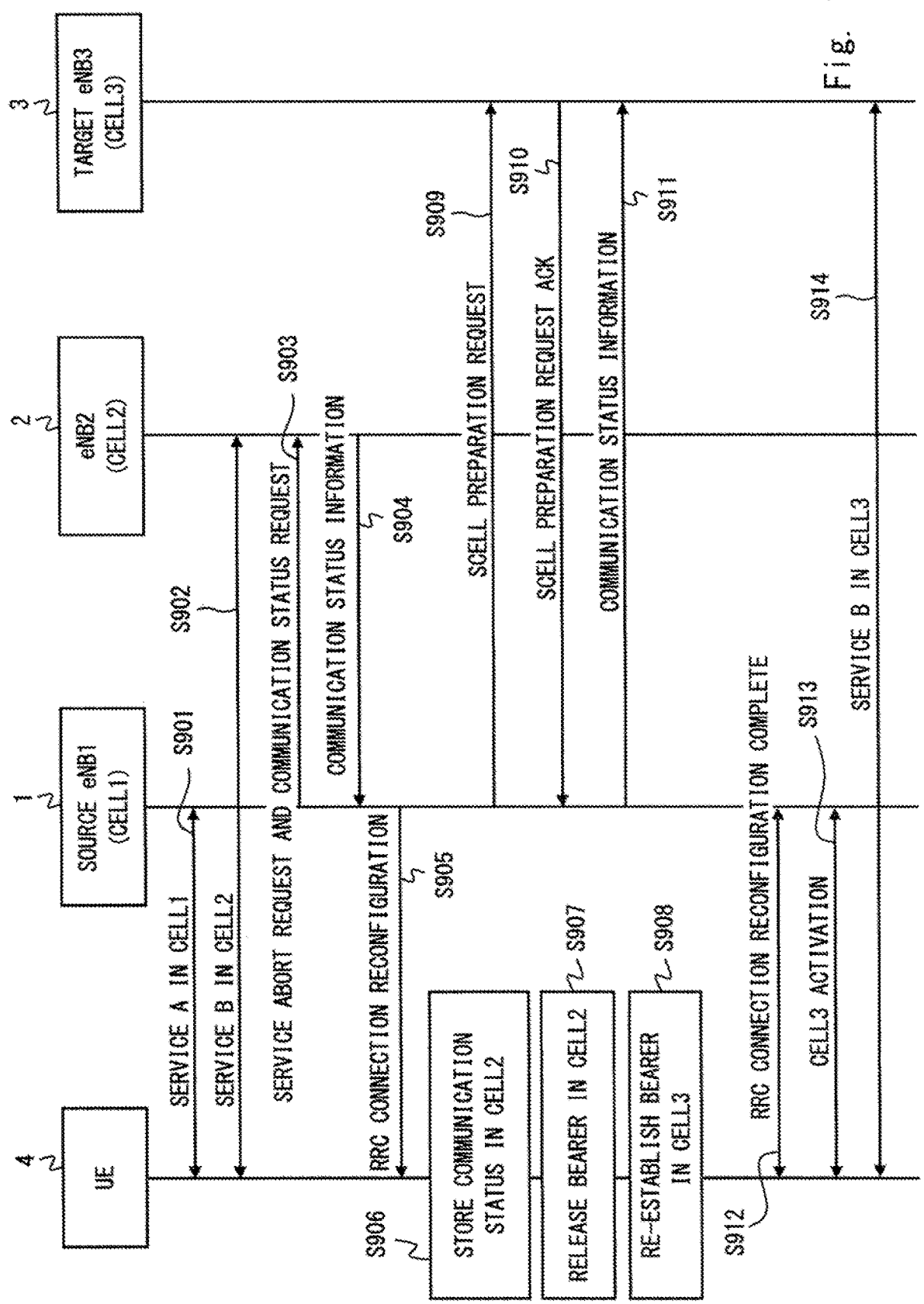
FIG. 14 is a sequence diagram illustrating an example of the communication control method in the radio communication system according to a second embodiment (Procedure Example 3).

FIG. 14 is an example of a sequence diagram illustrating the entire process of Procedure Example 3. In FIG. 14, the first cell 10 is denoted by CELL1, the second cell 20 is denoted by CELL2, and the third cell 30 is denoted by CELL3. In step S901, the eNB1 and the UE 4 perform communication (service A) using the first cell 10 as the PCell. In step S902, the eNB2 and the UE 4 perform communication (service B) using the second cell 20 as the SCell. In step S903, the eNB1 determines to change the SCell of the radio terminal 4 to the third cell 30, and sends to the eNB2 an instruction to abort the service B in the second cell 20 and an instruction to report the communication status information (Service Abort Request and Communication Status Request). In step S904, the eNB2 aborts the service B in the cell 20 and sends to the eNB1 the communication status information of the UE 4 on the cell 20. In step S905, the eNB1 transmits a SCell change instruction (RRC Connection Reconfiguration) to the UE 4. The SCell change instruction (RRC Connection Reconfiguration) includes, for example, release (de-configuration) of the cell 20 and configuration of the cell 30.

In steps S905 to S908, while keeping the communication status information on the cell 20, the UE 4 releases the bearer in the cell 20 (Release Bearer in Cell2) and re-configures the bearer in the cell 30 (Re-establish bearer in Cell3). In step S909, the eNB1 sends a SCell preparation request to the eNB3. In step S910, the eNB3 prepares the cell 30 in order to provide a SCell to the radio terminal 4, and sends to the eNB1 a response (SCell preparation request ACK) to the SCell preparation request. In step S911, the eNB1 sends, to the eNB3, the communication status information of the UE 4 on the cell 20.

In step S912, the eNB1 and the UE 4 complete the SCell change (RRC Connection Reconfiguration Complete). In step S913, the eNB1 instructs the UE 4 to activate the third cell 30 as a SCell (Cell3 activation). In step S914, the eNB3 and the UE 4 resume the service B in the SCell after the change (i.e., the cell 30).

In step S905 of FIG. 14, transmission of the SCell change instruction from the eNB1 to the UE 4 is performed by transmitting an instruction to de-configure the cell 20 and configure the cell 30 using an RRC Connection Reconfiguration message. However, alternatively, transmission of the SCell change instruction to the UE 4 may be performed by another method. For example, the eNB1 may transmit to the UE 4 an instruction to delete the cell 20 and add the cell 30.

In step S905 of FIG. 14, the eNB1 may explicitly inform the UE 4 to keep the communication status information of the cell 20 (or to perform the SCell change while keeping the communication status information) together with the RRC Connection Reconfiguration message or using a separate message. Further, in this case, the eNB1 may inform the UE 4 to release the bearer in the cell 30.

The release of the SCell Bearer by the UE 4 in step S907 of FIG. 14 may be performed by releasing the radio resource configuration (e.g., Radio Resource Config Common, Radio Resource Config Dedicated), for example. Moreover, the release of the SCell bearer may be performed by releasing either one or both of the Data Radio Bearer (DRB) and Signaling Radio Bearer (SRB) established in the cell 20.

The resuming (continuing) of the service B in steps S908 and S914 of FIG. 14 may be performed by re-establishing the Packet Data Convergence Protocol (PDCP) layer and Radio Link Control (RLC) layer corresponding to the bearer (e.g., a radio Bearer) established in the cell 20. Thus, the resuming of the service B in steps S908 and S914 can be also referred to as bearer re-establishment or bearer reconfiguration.

An interface used for connection between the eNB1 and the eNB2 (e.g., LPN) or connection between the eNB1 and the eNB3 (e.g., LPN) may be an X2 interface between eNBs or may be a new interface (e.g., an X3 interface) between an eNB and a LPN. Alternatively, the exchange of messages between the eNB1 and eNB2 or the exchange of messages between the eNB1 and eNB3 may be performed using an S1 interface through the EPC.

Modification of Procedure Example 3

In Procedure Example 3 described above, an example in which the communication status information of the UE 4 on the second cell 20 is transmitted from the eNB2 to the eNB3 via the eNB1 has been illustrated. However, alternatively, the eNB2 may send the communication status information directly to the eNB3 without via the eNB1. In an example, the eNB1 may request the eNB2 to send the communication status information of the UE 4 on the second cell 20 to the eNB3. In this case, the eNB2 may send the communication status information to the eNB3 in response to the request from the eNB1. In another example, the eNB3 may request the eNB2 to send the communication status information of the UE 4 on the second cell 20. In this case, the eNB2 may send the communication status information to the eNB3 in response to the request from the eNB3.

Procedure Example 4

Figure 15:
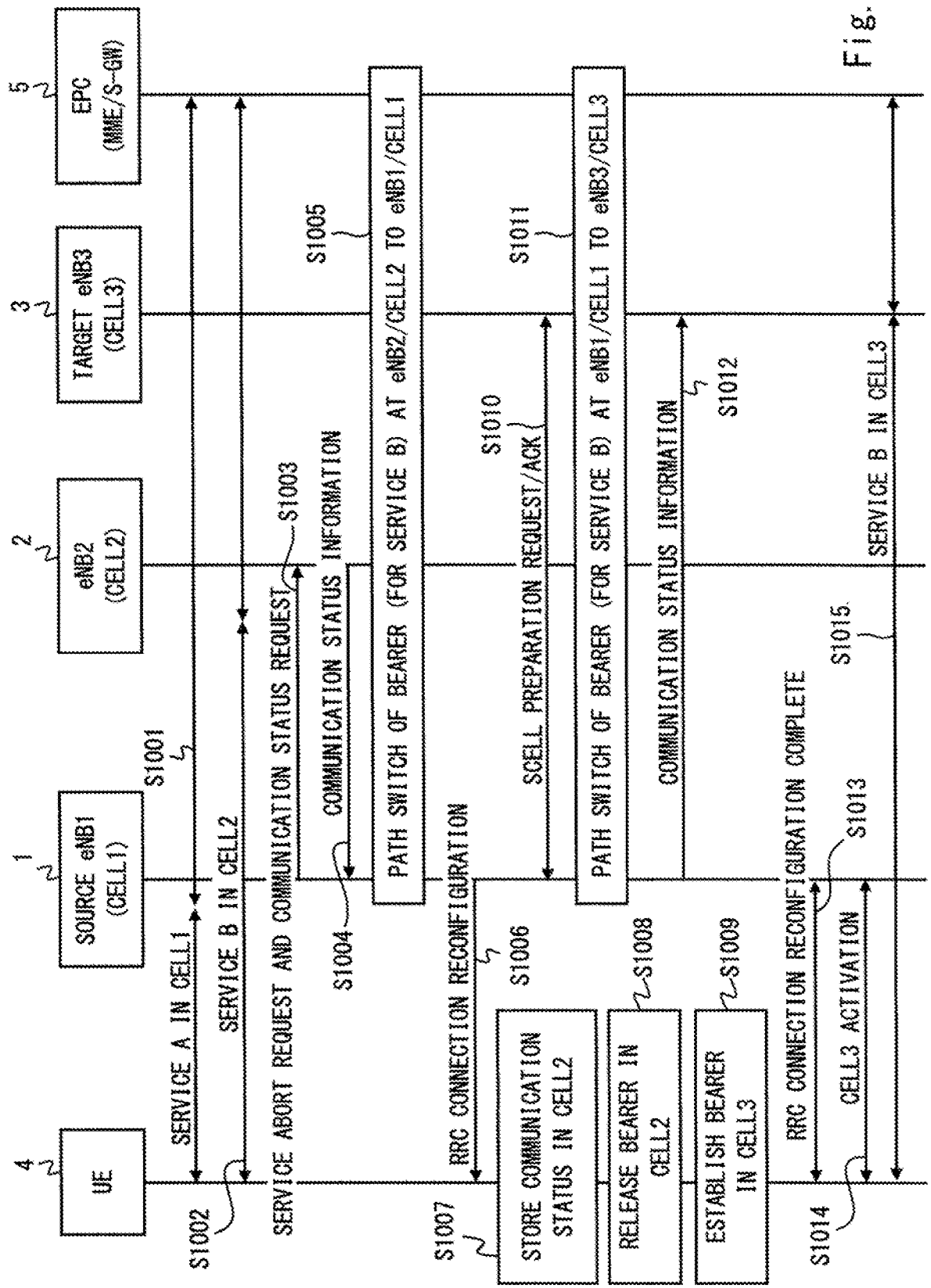
FIG. 15 is a sequence diagram illustrating an example of a communication control method in a radio communication system according to a second embodiment (Procedure Example 4).

In Procedure Example 4, the process of the EPC 5 is added to Procedure Example 3. FIG. 15 is an example of a sequence diagram illustrating the entire process of Procedure Example 4. In FIG. 15, the cells 10, 20, and 30 are denoted by CELL1, CELL2, and CELL3, respectively. The processes of steps S1001 to S1004 of FIG. 15 are similar to the processes of steps S901 to S904 of FIG. 14.

In step S1005 of FIG. 15, the eNB1 sends, to the EPC 5 (e.g., a Mobility Management Entity (MME)), a bearer switch request for changing the bearer for the service B of the radio terminal 4, which passes through the cell 20 of the eNB2, to a bearer through the cell 10 of the eNB1 (Path switch of bearer (for service B) at eNB2/Cell2 to eNB1/Cell1). Alternatively, the eNB2 may send the bearer switch request to the EPC 5.

The processes of steps S1006 to S1010 of FIG. 15 are similar to the processes of steps S905 to S910 of FIG. 14. In step S1011 of FIG. 15, the eNB1 sends, to the EPC 5 (e.g., an MME), a bearer switch request for changing the bearer for the service B of the radio terminal 4, which passes through the cell 10 of the eNB1, to a bearer through the cell 30 of the eNB3 (Path switch of bearer (for service B) at eNB1/Cell1 to eNB3/Cell3). The processes of steps S1012 to S1015 of FIG. 15 are similar to the processes of steps S911 to S914 of FIG. 14.

Procedure Example 5

In Procedure Example 5, the process of the EPC 5 is added to Procedure Example 3. However, Procedure Example 5 illustrates different operations from Procedure Example 4. That is, in Procedure Example 5, the bearer of the radio terminal 4 configured in the SCell before the change (i.e., the cell 20) is changed directly to the SCell after the change (i.e., the cell 30) without changing the bearer to the PCell bearer.

Figure 16:
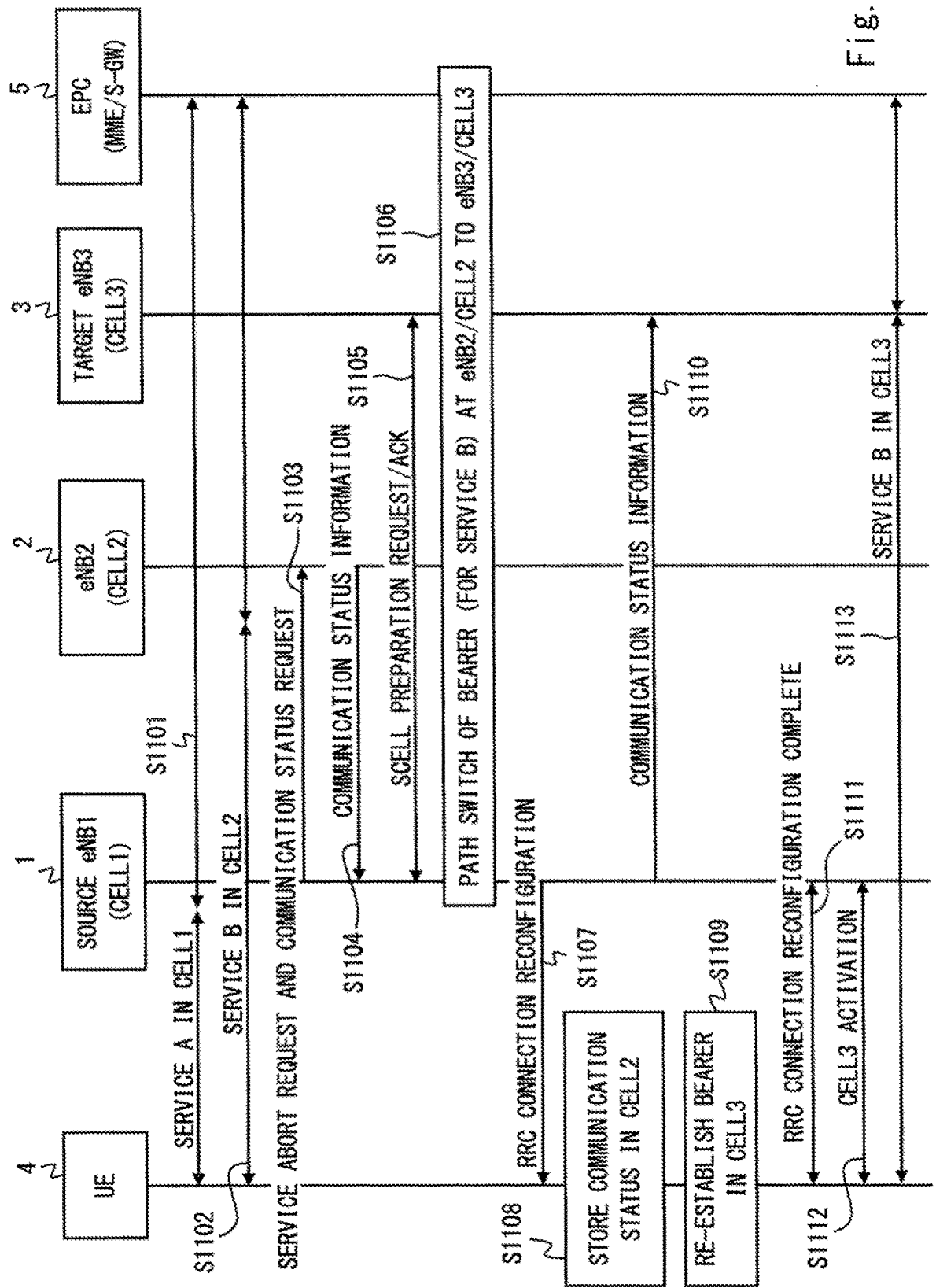
FIG. 16 is a sequence diagram illustrating an example of the communication control method in the radio communication system according to the second embodiment (Procedure Example 5).
Figure 17:
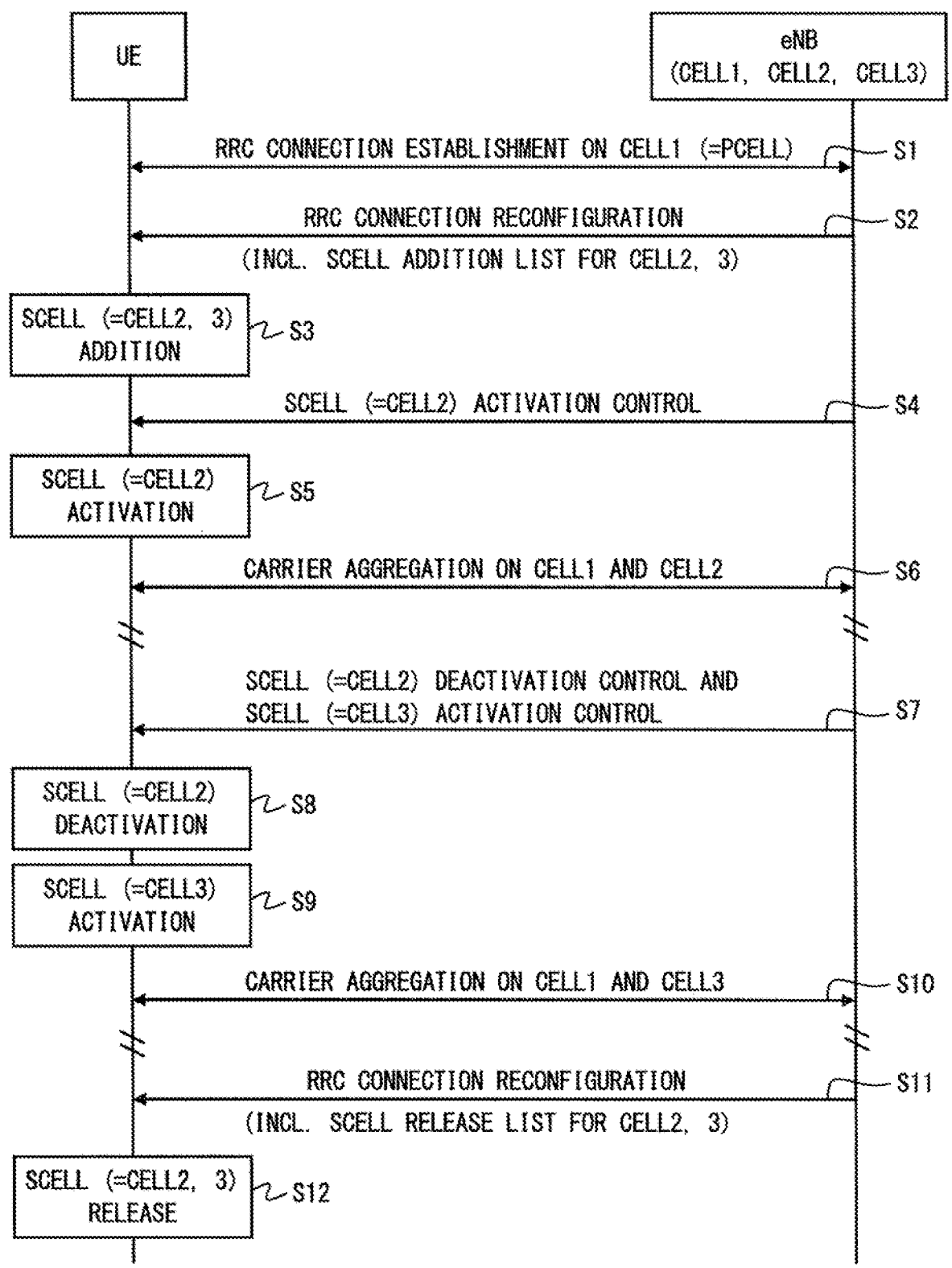
FIG. 17 is a sequence diagram illustrating a handover procedure in carrier aggregation of LTE (Background Art).

FIG. 16 is an example of a sequence diagram illustrating the entire process of Procedure Example 5. In FIG. 16, the cells 10, 20, and 30 are denoted by CELL1, CELL2, and CELL3, respectively. The processes of steps S1101 to S1104 of FIG. 16 are similar to the processes of steps S901 to S904 of FIG. 14.

Step S1105 of FIG. 16 corresponds to steps S909 and S910 of FIG. 14. That is, in step S1105, the eNB1 and eNB3 perform preparations for using the third cell 30. In step S1106, the eNB1 sends, to the EPC 5 (e.g., a Mobility Management Entity (MME)), a bearer switch request for changing the bearer for the service B of the radio terminal 4, which passes through the cell 20 of the eNB2, to a bearer through the cell 30 of the eNB3 (Path switch of bearer (for service B) at eNB2/Cell2 to eNB3/Cell3). Alternatively, the eNB2 may send the bearer switch request to the EPC 5.

The processes of steps S1107 to S1109 of FIG. 16 are similar to the processes of steps S905 to S908 of FIG. 14. Further, the processes of steps S1110 to S1113 of FIG. 16 are similar to the processes of steps S911 to S914 of FIG. 14.

OTHER EMBODIMENTS

The first and second embodiments described above may be applied to C/U Split configuration in which a macro cell having a wide coverage is used for transmission and reception of control-plane signals (C-Plane signals) such as mobility management of a UE and a pico cell which provides relatively better communication quality is used for transmission and reception of data-plane signals (U-Plane signals) such as user data. For example, the cell 10 of the eNB1 may be used for transmission and reception of C-Plane signals and the cells 20 and 30 of the eNB2 and 3 may be used for transmission of U-Plane signals.

The first and second embodiments described above can be applied to when changing the secondary cell (SCell) to another cell of the radio station (eNB) 2 (e.g., a cell using a different frequency or arranged in a different geographical area). Moreover, the first and second embodiments can be applied to a configuration in which a plurality of SCells is present before or after the SCell change.

The first and second embodiments described above can be applied to a configuration in which the PCell and SCell employ different duplex modes. For example, one of the PCell and SCell may employ a frequency division duplex (FDD) and the other may employ a time division duplex (TDD).

All the communication control methods performed by the radio station 1 (communication control unit 15), the radio station 2 (communication control unit 25), the radio station 3 (communication control unit 35), and the radio terminal 4 (communication control unit 45) described in the first and second embodiments may be implemented by using a semiconductor processing device including an Application Specific Integrated Circuit (ASIC). Alternatively, these methods may be implemented by causing a computer system including at least one processor (e.g., microprocessor, Micro Processing Unit (MPU), Digital Signal Processor (DSP)) to execute a program. Specifically, one or more programs including instructions for causing a computer system to perform the algorithms shown in the flowcharts and the sequence diagrams may be created and these programs may be supplied to a computer.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide a program to a computer via a wired communication line (e.g., electric wires, and optical fibers) or a wireless communication line.

In the above first and second embodiments, the LTE system has been mainly described. However, these embodiments may be applied to radio communication systems other than the LTE system, for example, a 3GPP Universal Mobile Telecommunications System (UMTS), a 3GPP2 CDMA2000 system (1×RTT, High Rate Packet Data (HRPD)), a Global System for Mobile Communications (GSM) system, or a WiMAX system.

Further, the above embodiments are merely examples of applications of technical ideas obtained by the present inventors. Needless to say, these technical ideas are not limited to the above embodiments and may be changed in various ways.

This application is based upon and claims the benefit of priority from Japanese Patent Application No. 2012-288212, filed on Dec. 28, 2012, the disclosure of which is incorporated herein in its entirety by reference.

REFERENCE SIGNS LIST

1 FIRST RADIO STATION
2 SECOND RADIO STATION
3 THIRD RADIO STATION
4 RADIO TERMINAL
5 CORE NETWORK
6 RADIO NETWORK
10 FIRST CELL
20 SECOND CELL
30 THIRD CELL
15 COMMUNICATION CONTROL UNIT
25 COMMUNICATION CONTROL UNIT
35 COMMUNICATION CONTROL UNIT
45 COMMUNICATION CONTROL UNIT

The invention claimed is:

1. A radio terminal comprising:
a memory storing instructions; and
at least one processor configured to process the instructions to:
communicate with a radio station system comprising a first cell operated by a first radio station as a Primary Cell and either a second cell operated by a second radio station as a Secondary Cell or a third cell operated by a third radio station as the Secondary Cell, wherein
the at least one processor is configured to:
in a case where the second cell is operated as the Secondary Cell, and the radio terminal receives, from the first radio station, a Radio Resource Control (RRC) Connection Reconfiguration message indicating that the Secondary cell is to be changed from the second cell to the third cell while maintaining a RRC connection established between the radio terminal and the first radio station,
keep Data Radio Bearer information related to the second cell and release a configuration of the second cell, and
transmit, to the first radio station, a RRC Connection Reconfiguration complete message.

2. The radio terminal according to claim 1, wherein the at least one processor is further configured to re-establish at least Radio Link Control (RLC) layer for the Secondary Cell upon receiving, from the first radio station, the RRC Connection Reconfiguration message.

3. The radio terminal according to claim 1, wherein the at least one processor is further configured to re-establish at least Packet Data Convergence Protocol (PCDP) layer for the Secondary Cell upon receiving, from the first radio station, the RRC Connection Reconfiguration message.

4. A communication control method in a radio terminal, the method comprising:
communicating with a radio station system comprising a first cell operated by a first radio station as a Primary Cell and either a second cell operated by a second radio station as a Secondary Cell or a third cell operated by a third radio station as the Secondary Cell; and
in a case where the second cell is operated as the Secondary Cell, and the radio terminal receives, from the first radio station, a Radio Resource Control (RRC) Connection Reconfiguration message indicating that the Secondary Cell is to be changed from the second cell to the third cell while maintaining a RRC connection established between the radio terminal and the first radio station,
keeping Data Radio Bearer information related to the second cell and releasing a configuration of the second cell, and
transmitting, to the first radio station, a RRC Connection Reconfiguration complete message.

5. A first radio station comprising:
a memory storing instructions; and
at least one processor configured to process the instructions to:
operate a first cell; and
communication with a radio terminal using the first cell as a Primary Cell and either a second cell operated by a second radio station as a Secondary Cell or a third cell operated by a third radio station as the Secondary Cell, wherein
in a case where the second cell is operated as the Secondary Cell and the first radio station decides to change the Secondary cell from the second cell to the third cell while maintaining a Radio Resource Control (RRC) connection established between the radio terminal and the first radio station,
transmit, to the second radio station, a request to stop providing user data to the radio terminal in the second cell,
transmit, to the radio terminal, a RRC Connection Reconfiguration message to keep Data Radio Bearer information related to the second cell and release a configuration of the second cell by the radio terminal, and
receive, from the radio terminal, a RRC Connection Reconfiguration complete message.

6. A communication control method in a first radio station, the method comprising:
communicating with a radio terminal using the first cell as a Primary Cell and either a second cell operated by a second radio station as a Secondary Cell or a third cell operated by a third radio station as the Secondary Cell; and
in a case where the second cell is operated as the Secondary Cell and the first radio station decides to change the Secondary cell from the second cell to the third cell while maintaining a Radio Resource Control (RRC) connection established between the radio terminal and the first radio station,
transmitting, to the second radio station, a request to stop providing user data to the radio terminal in the second cell,
transmitting, to the radio terminal, a RRC Connection Reconfiguration message to keep Data Radio Bearer information related to the second cell and release a configuration of the second cell by the radio terminal, and
receiving, from the radio terminal, a RRC Connection Reconfiguration complete message.

* * * * *